(12) United States Patent
Futatsugi et al.

(10) Patent No.: US 8,351,523 B2
(45) Date of Patent: Jan. 8, 2013

(54) RADIO COMMUNICATION METHOD AND DEVICE IN SINGLE-CARRIER TRANSMISSION SYSTEM

(75) Inventors: Yasunori Futatsugi, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 783 days.

(21) Appl. No.: 12/457,839

(22) Filed: Jun. 23, 2009

(65) Prior Publication Data

US 2009/0323796 A1    Dec. 31, 2009

(30) Foreign Application Priority Data

Jun. 30, 2008   (JP) .................. 2008-170041

(51) Int. Cl.
*H04K 1/10*   (2006.01)
(52) U.S. Cl. ....................................... 375/260
(58) Field of Classification Search .............. 375/267, 375/227, 350, 232, 260
See application file for complete search history.

(56) References Cited

U.S. PATENT DOCUMENTS

| | | | |
|---|---|---|---|
| 7,042,937 B2 | 5/2006 | Birru | |
| 8,094,709 B2 * | 1/2012 | Kimata | 375/232 |
| 2003/0007554 A1 | 1/2003 | Birru | |
| 2006/0262869 A1 * | 11/2006 | Yoshida | 375/260 |
| 2007/0002985 A1 * | 1/2007 | Kimata et al. | 375/350 |
| 2008/0291990 A1 * | 11/2008 | Yoshida et al. | 375/227 |
| 2009/0262853 A1 * | 10/2009 | Yoshida et al. | 375/267 |

FOREIGN PATENT DOCUMENTS

| | | |
|---|---|---|
| JP | 11-122312 A | 4/1999 |
| JP | 2004-530365 A | 9/2004 |
| WO | 02/087182 A1 | 10/2002 |

OTHER PUBLICATIONS

D. Falconer, et al., "Frequency Domain Equalization for Single-Carrier Broadband Wireless Systems," IEEE Communcations Magazine, vol. 40, No. 4 (2002), pp. 58-66.
A. Nakajima, et al., "Interative Frequency-domain Interference Cancellation of Inter-code Interference and Inter-antenna Interference," Technical Report of IEICE (Institute of Electronics, Information and Communication Engineers), vol. 106, No. 555 (2007), pp. 61-64.
Y. Futatsugi, et al., "Interative Frequency Domain Equalization for MIMO Multiplexing in Uplink Single-Carrier FDMA," Proceedings of IEICE Society Conference (2007), p. 377.

* cited by examiner

*Primary Examiner* — Jaison Joseph
(74) *Attorney, Agent, or Firm* — McGinn IP Law Group PLLC

(57) ABSTRACT

A radio communication device for receiving a single-carrier signal transmitted in a partial spectrum of Nyquist frequency band, includes: an interference eliminator for eliminating interference from a received signal by spectrum reproduction of non-transmitted spectra using a symbol replica, to output an interference eliminated signal, wherein the interference includes intersymbol interference which is caused by symbols which are more than a predetermined distance away from a decision symbol point; a symbol sequence estimator for estimating a transmission symbol sequence by separating nearby intersymbol interference within the predetermined distance of the decision symbol point based on the interference eliminated signal, to output a decision signal; and a replica generator for generating the symbol replica from decoding result of the decision signal, wherein the symbol replica is fed back to the frequency-domain interference eliminator.

23 Claims, 12 Drawing Sheets

B=3、ROLL-OFF FACTOR=0

B=1、ROLL-OFF FACTOR=0

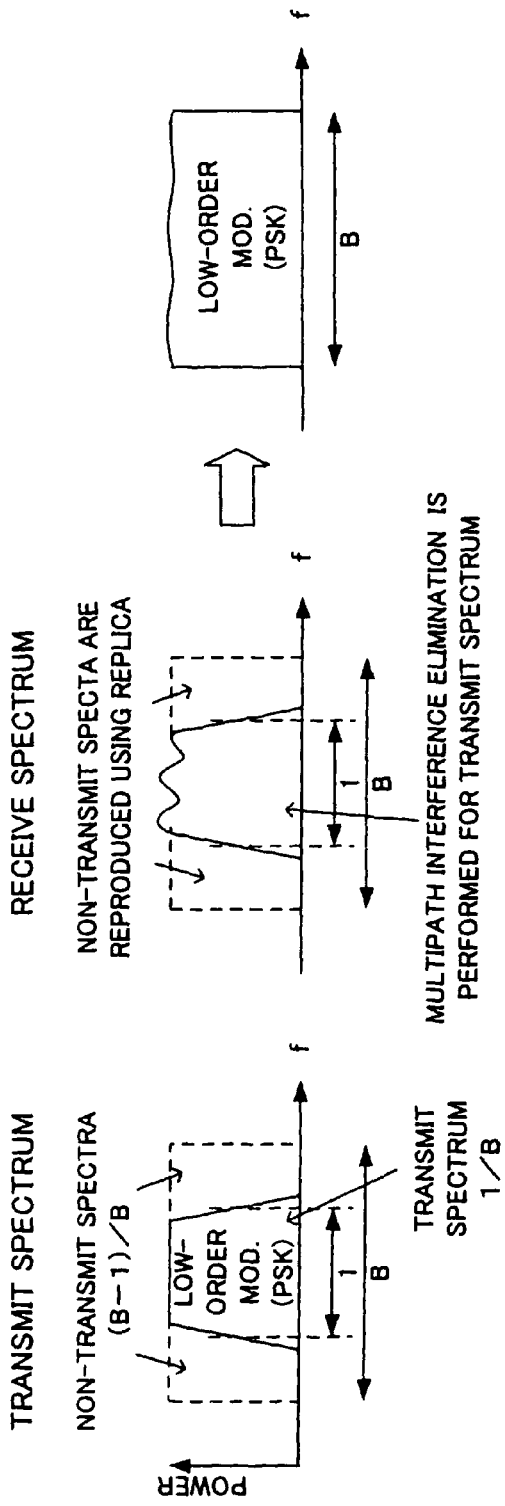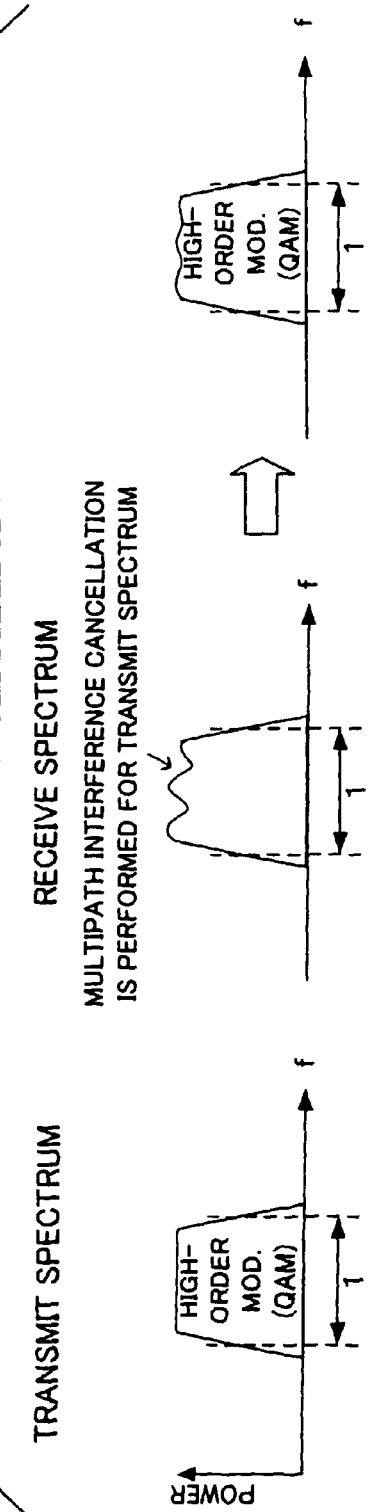

等化所望成分

DECODING/REPLICA GENERATION SECTION 207

RADIO COMMUNICATION METHOD AND DEVICE IN SINGLE-CARRIER TRANSMISSION SYSTEM

BACKGROUND OF THE INVENTION

1. Field of the Invention

This application is based upon and claims the benefit of priority from Japanese Patent Application No. 2008-170041, filed on Jun. 30, 2008, the disclosure of which is incorporated herein in its entirety by reference.

The present invention relates to a communication system for transmitting single-carrier signals by radio and, more particularly, to a radio communication method and device having a function of eliminating interference.

2. Description of the Related Art

For the uplink of next-generation mobile communication, a single-carrier (SC) transmission scheme, which provides a low peak to average power ratio (PAPR), is employed as a radio access scheme because high efficiency of transmission power needs to be accomplished on the terminal side.

Moreover, in wireless packet communication, adaptive modulation and channel coding (AMC) is employed, in which a modulation method is selected depending on the received SINR (Signal to Interference and Noise power Ratio). Specifically, a high-order modulation scheme such as 16 quadrature amplitude modulation (QAM) with high transmission rate is selected when a received SINR is good, and a low-order modulation scheme such as quadrature phase shift keying (QPSK) having relatively high tolerance for noise is selected when a received SINR deteriorates.

However, multipath interference is problematic when data transmission is performed using a single-carrier signal. Deterioration of the reception characteristics is particularly conspicuous when a high-order modulation scheme is used. Various technologies for suppressing this multipath interference are proposed. For example, in Falconer, D., Ariyavisitakul, S. L., Benyamin-seeyar, A., and Eidson, B., "Frequency Domain Equalization for Single-Carrier Broadband Wireless Systems," IEEE Communications Magazine, Vol. 40, No. 4 (April 2002), pp. 58-66, a frequency domain equalizer is discussed that equalizes multipath interference in the frequency domain at a receiving device receiving a single-carrier signal. In Nakajima, A., and Adachi, F., "Iterative Frequency-domain Interference Cancellation of Inter-code Interference and Inter-antenna Interference," Technical Report of IEICE (Institute of Electronics, Information and Communication Engineers), Vol. 106, No. 555 (March 2007), pp. 61-64, a receiving device is discussed that generates a multipath interference replica by using a signal after frequency-domain equalization and eliminates a residual multipath interference component in the frequency domain. Moreover, in Futatsugi, Y., and Yoshida, S., "Iterative Frequency Domain Equalization for MIMO Multiplexing in Uplink Single-Carrier FDMA," in the Proceedings of IEICE Society Conference 2007, B-5-55, a receiving device is discussed that generates a multipath interference replica from bit replicas after decoding.

Moreover, for a technology of eliminating intersymbol interference, for example, a communication system is proposed in Japanese Patent Application Unexamined Publication No. H11-122312 in which the band to be used by a transmission signal is restricted by using a band filter narrower than the Nyquist bandwidth and in which intersymbol interference due to the restriction on the used bandwidth is separated on the receiving side by using a time domain adaptive equalizer.

Further, according to a frequency-time domain hybrid equalizer proposed in Japanese Patent Application Unexamined Publication 2004-530365, a frequency domain equalizer and a time domain equalizer eliminate intersymbol interference by using an error vector generated from a feedback signal before trellis decoding.

As described above, when a high-order modulation scheme is used, the number of signal points is larger than when a low-order modulation scheme is used, and the distance between signal points is small relative to the average symbol power, resulting in the degraded reception characteristics. Particularly in a case of QAM transmission of a single-carrier signal over multipath propagation, residual multipath interference cannot be completely eliminated, resulting in the reception characteristics of QAM modulation greatly deteriorating due to this residual multipath interference.

In addition, the system disclosed in Japanese Patent Application Unexamined Publication No. H11-122312 has the problem that, since intersymbol interference is separated by using the time domain adaptive equalizer, the adaptive equalizer has an increased number of states and therefore the amount of operation increases when the roll-off factor is small and the length of an interfering symbol is large.

According to the equalizer disclosed in Japanese Patent Application Unexamined Publication No. 2004-530365, the accuracy of the error vector generated from a feedback signal before decoding is degraded when large intersymbol interference occurs. Therefore, there is a problem that intersymbol interference cannot be sufficiently eliminated by the frequency domain equalizer and time domain canceller that perform the elimination depending on the error vector.

SUMMARY OF THE INVENTION

Accordingly, an object of the present invention is to provide a radio communication method and a communication device that can enhance the transmission characteristics of a single-carrier signal over multipath propagation and can achieve high-speed radio transmission.

According to the present invention, a radio communication device for receiving a single-carrier signal transmitted in a partial spectrum of Nyquist frequency band, includes: an interference eliminator for eliminating interference from a received signal by spectrum reproduction of non-transmitted spectra using a symbol replica, to output an interference eliminated signal, wherein the interference includes intersymbol interference which is caused by symbols which are more than a predetermined distance away from a decision symbol point; a symbol sequence estimator for estimating a transmission symbol sequence by separating nearby intersymbol interference within the predetermined distance of the decision symbol point based on the interference eliminated signal, to output a decision signal; and a replica generator for generating the symbol replica from decoding result of the decision signal, wherein the symbol replica is fed back to the frequency-domain interference eliminator.

According to the present invention, a method for receiving a single-carrier signal in a radio communication device, wherein the single-carrier signal is transmitted in a partial spectrum of Nyquist frequency band, comprising: eliminating interference from a received signal by spectrum reproduction of non-transmitted spectra using a symbol replica, to output an interference eliminated signal, wherein the interference includes intersymbol interference which is caused by symbols which are more than a predetermined distance away from a decision symbol point; estimating a transmission symbol sequence by separating nearby intersymbol interference within the predetermined distance of the decision symbol point based on the interference eliminated signal, to output a decision signal; and generating the symbol replica from decoding result of the decision signal, wherein the symbol replica is fed back to the frequency-domain interference eliminator.

As described above, according to the present invention, the transmission characteristics of a single-carrier signal over multipath propagation can be enhanced, and high-speed radio transmission can be achieved.

BRIEF DESCRIPTION OF THE DRAWINGS

FIG. 2A is a spectrum diagram for describing elimination of multipath interference by a spectrum reproduction method in a communication system according to an exemplary embodiment of the present invention.

FIG. 2B is a spectrum diagram for describing, as a comparative example, elimination of multipath interference according to the transmit spectrum of the Nyquist band.

DETAILED DESCRIPTION OF THE PREFERRED EMBODIMENTS

1. Exemplary Embodiment

According to an exemplary embodiment of the present invention, a transmitting device transmits a signal according to partial spectrum selection and a receiving device decodes the received signal and uses the decoded signal to perform spectrum reproduction by frequency-domain processing and symbol sequence estimation by time-domain processing, which cause elimination of residual multipath interference and elimination of intersymbol interference due to the partial spectrum selection. As will be described later, the frequency-domain spectrum reproduction eliminates interference components more than a predetermined distance away from a decision symbol point, and the time-domain symbol sequence estimation separates nearby interference within the predetermined distance of the decision symbol point. This will be described in detail below.

a) Partial Spectrum Transmission

Figure 1A:
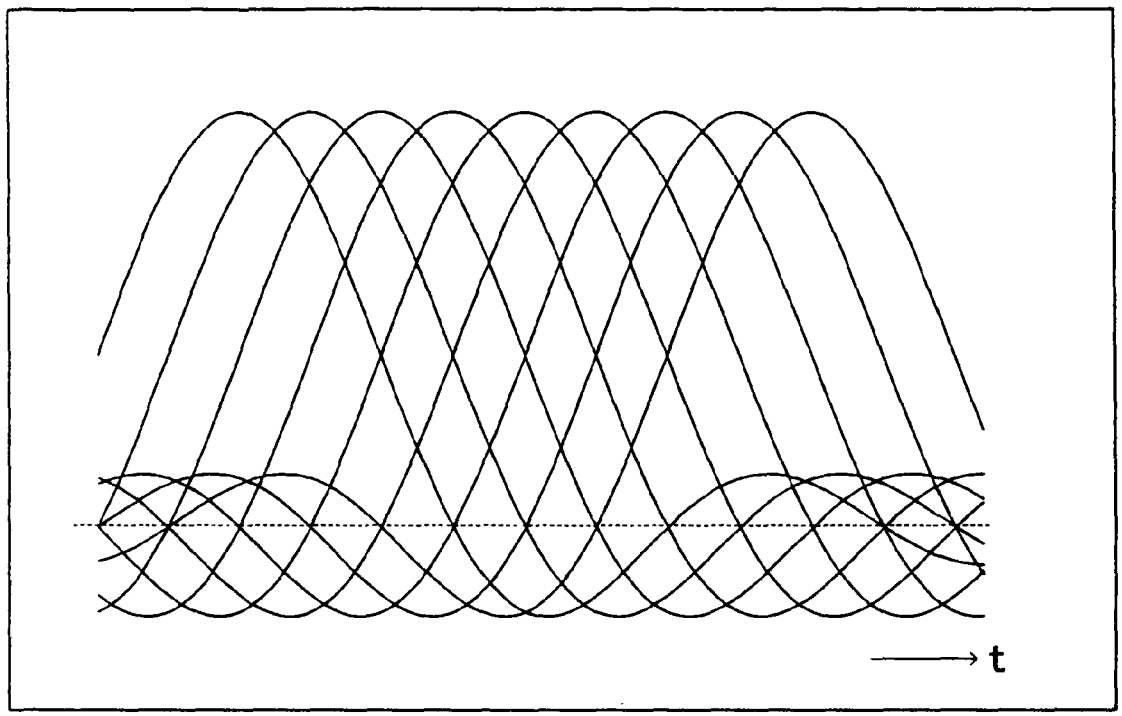
FIG. 1A is a wave-form diagram showing the impulse responses of symbols when transmission is performed through partial spectrum selection.
Figure 1B:
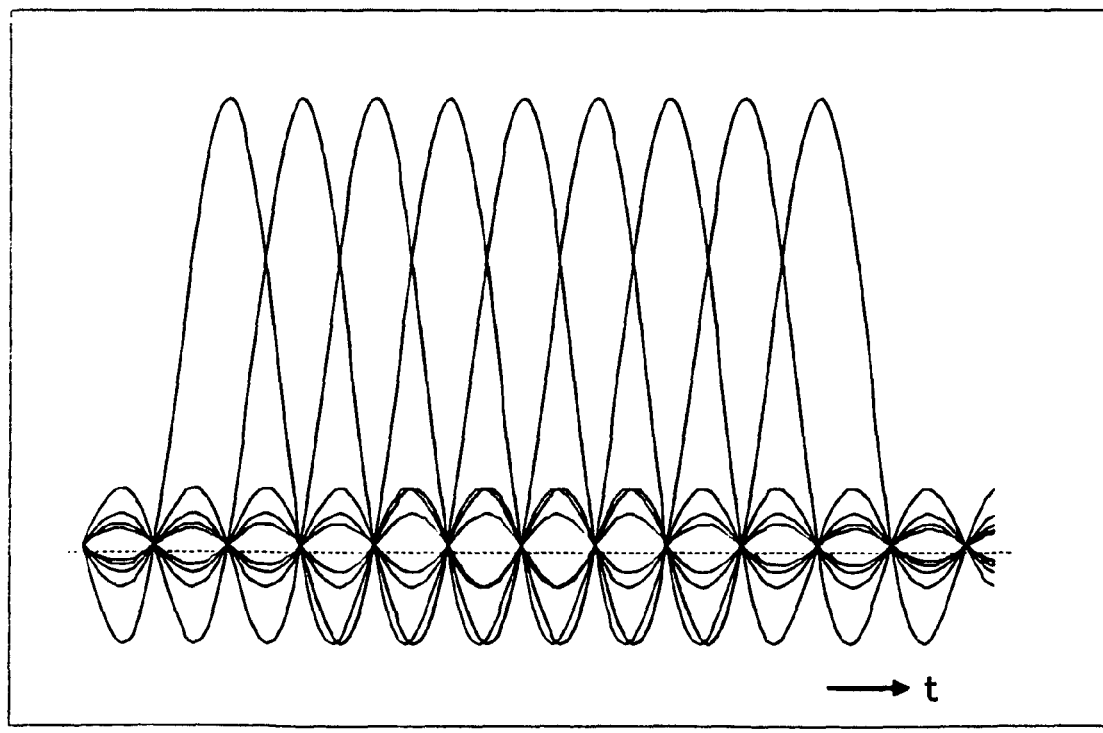
FIG. 1B is a waveform diagram showing the impulse responses of symbols when transmission is made over the transmit spectrum of the Nyquist band.

FIG. 1A is a waveform diagram showing the impulse responses of symbols when transmission is performed through partial spectrum selection, and FIG. 1B is a waveform diagram showing the impulse responses of symbols when transmission is made over a transmit spectrum of the Nyquist bandwidth.

FIG. 1A shows waveforms in a case where the partial spectrum selection index B=3 and the roll-off factor=0, as an example. Here, assume that B (a real number not smaller than one) is the bandwidth ratio of the Nyquist frequency spectrum to a transmit frequency spectrum when the bandwidth of the transmit frequency spectrum is assumed to be one, and that the center 1/B portion of the Nyquist frequency band is the transmit frequency spectrum. When B>1, the transmit frequency spectrum is the center portion spectrum (1/B) of the Nyquist frequency spectrum. When B=1, the transmit frequency spectrum is equal to the Nyquist frequency spectrum. Hereinafter, B will be referred to as partial spectrum selection index.

In partial spectrum transmission, since transmitted is only the center 1/B band spectrum of the Nyquist band frequency spectrum, the impulse response of each symbol is broadened, resulting in intersymbol interference occurring to each symbol. On the other hand, in the case shown in FIG. 1B, since transmission is made over the Nyquist band spectrum, the impulse responses of all other symbols are null at each symbol point, with no intersymbol interference occurring.

According to the present exemplary embodiment, residual multipath interference and intersymbol interference due to partial spectrum transmission as shown in FIG. 1A are eliminated by spectrum reproduction in the frequency domain and symbol sequence estimation in the time domain.

b) Spectrum Reproduction in the Frequency Domain

FIG. 2A is a spectrum diagram for describing elimination of multipath interference by a spectrum reproduction method in a communication system according to the exemplary embodiment of the present invention, and FIG. 2B is a spectrum diagram for describing, as a comparative example, elimination of multipath interference according to a transmit spectrum of the Nyquist band spectrum.

Referring to FIG. 2A, in the present exemplary embodiment, when a received SINR is good, a transmitting device generates a wide-band transmission signal by using low-order (relatively low-order) modulation and transmits only the center 1/B spectrum, excluding the outer (B-1)/B spectra in the frequency domain. A receiving device eliminates residual multipath interference by equalizing the transmit spectrum in the frequency domain as is generally performed. As to the spectra that the transmitting device has not transmitted, the receiving device reproduces the spectra by using a replica, which will be described in detail later.

On the other hand, in the comparative example shown in FIG. 2B, when a SINR is good, a transmitting device modulates a transmission signal by using high-order (relatively high-order) modulation and transmits the signal in the Nyquist bandwidth. A receiving device equalizes the received signal having the transmit spectrum and thereby eliminates residual multipath interference. However, as described already, the interference cannot be sufficiently eliminated even by using the techniques disclosed in Japanese Patent Application Unexamined Publication Nos. H11-122312 and 2004-530365.

c) Symbol Sequence Estimation in the Time Domain

According to the spectrum reproduction method, since a replica cannot be obtained upon the initial receipt, intersymbol interference cannot be eliminated, resulting in the characteristics being greatly impaired. Accordingly, in the present exemplary embodiment, while the relatively small interference of many symbols that are distant from a decision symbol point is eliminated in the frequency domain (spectrum reproduction method), the intersymbol interference of those symbols that are near the decision symbol point and have dominant electric power is separated by sequence estimation in the time domain. Here, the symbols that are near a decision symbol point (hereinafter, referred to as nearby symbols where appropriate) are symbols temporally before and after the decision symbol point and exert dominant intersymbol interference on the decision symbol point.

Figure 3:
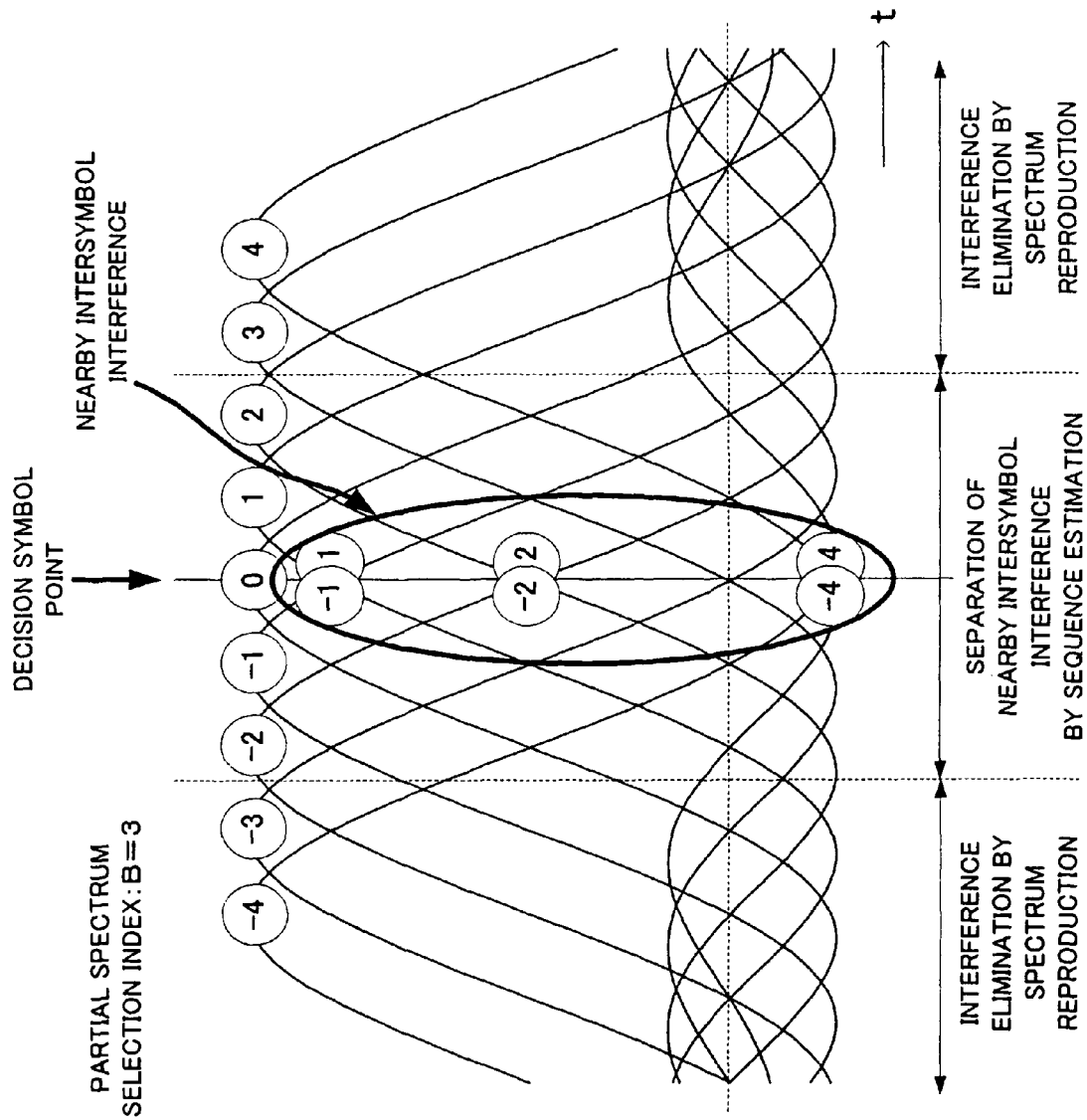
FIG. 3 is a diagram of waveforms when partial spectrum transmission is made, to describe interference elimination by spectrum reproduction in the frequency domain and symbol sequence estimation in the time domain.

FIG. 3 is a diagram of waveforms when partial spectrum transmission is made, to describe interference elimination by the spectrum reproduction in the frequency domain and the symbol sequence estimation in the time domain. Here, shown is a case where B=3 as in FIG. 1A.

Referring to FIG. 3, assuming that Symbol 0 is a decision symbol point, the signal of Symbol 0 is not interfered by those symbols that are numbered multiples of 3, but is interfered by all the other symbols. Great interference is exerted particularly from Symbols ±1 and ±2 which are within a predetermined distance of the decision symbol point. Therefore, according to the present exemplary embodiment, Symbols 0, ±1, and ±2 are separated by the sequence estimation in the time domain, and symbol interference from Symbols ±4 and more distant symbols, which are more than the predetermined distance away from the decision symbol point, is eliminated by the spectrum reproduction in the frequency domain. Thereby, the characteristics at the time of initial receipt can be improved while the amount of operation required for the sequence estimation can be reduced to a small amount. Hereinafter, specific examples of the present invention will be described.

2. First Example

Hereinafter, a detailed description will be given of a communication system in which a signal modulated by using a low-order modulation scheme is transmitted by partial spectrum transmission and in which intersymbol interference is eliminated by performing spectrum reproduction and symbol sequence estimation on the received signal.

2.1) Transmitting Device

Figure 4:
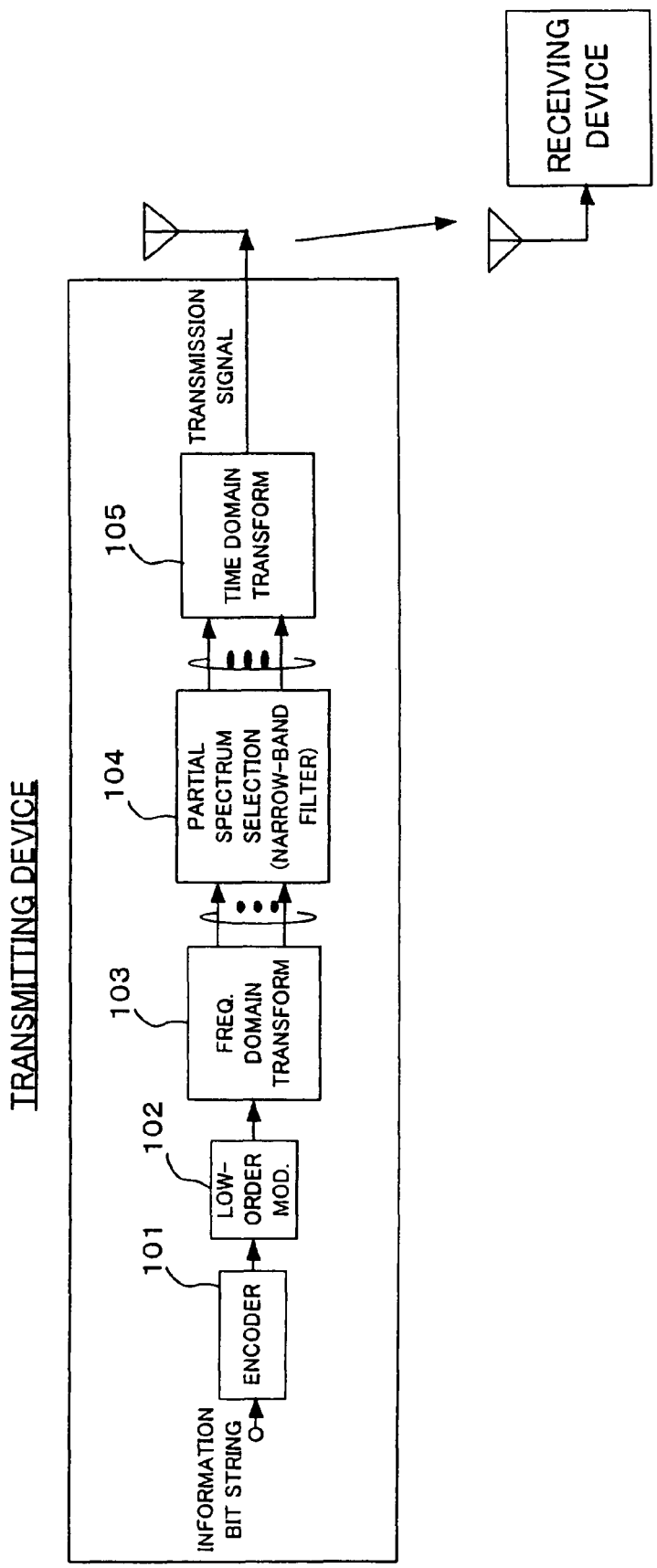
FIG. 4 is a block diagram showing a schematic configuration of a transmitting device in a communication system according to a first example of the present invention.

FIG. 4 is a block diagram showing a schematic configuration of a transmitting device in a communication system according to a first example of the present invention. The transmitting device includes an encoding section 101, a low-order modulation section 102, a frequency domain transform section 103, a partial spectrum selection section (narrow-band transmission filter) 104, and a time domain transform section 105.

The encoding section 101 encodes a transmission information bit string, interleaves the encoded bits, and outputs the interleaved encoded bits to the low-order modulation section 102. For encoding, a convolution code or turbo code is used, in general.

The low-order modulation section 102 modulates the encoded bit string input from the encoding section 101 by using a low-order modulation scheme (for example, PSK or the like), which provides relatively high tolerance for noise, and outputs the low-order-modulated signal to the frequency domain transform section 103.

The frequency domain transform section 103 transforms the signal modulated by the low-order modulation section 102 from the time domain into the frequency domain and outputs the frequency-domain signal to the partial spectrum selection section 104. For the transform scheme at the frequency domain transform section 103, discrete Fourier transform (DFT) or fast Fourier transform (FFT) is used, in general.

The partial spectrum selection section 104 selects a partial spectrum which is the center 1/B band of the frequency spectrum of the input frequency-domain signal, that is, the signal in the Nyquist bandwidth, and outputs the selected partial spectrum to the time domain transform section 105. A narrow-band transmission filter is used as the partial spectrum selection section 104 when allowing the selected partial spectrum to have frequency characteristics. For the transmission filter, a raised-cosine roll-off filter for the 1/B portion of the Nyquist band is used, for example.

The time domain transform section 105 transforms the signal with the spectrum selected by the partial spectrum selection section 104 from the frequency domain into the time domain and outputs the time-domain signal. For the transform into the time-domain, inverse discrete Fourier transform (IDFT) or inverse fast Fourier transform (IFFT) is used, in general.

Since the transmitting device transmits only the center 1/B spectrum of the Nyquist band frequency spectrum by using the partial spectrum selection section 104, the impulse response of each symbol is broadened, resulting in intersymbol interference occurring, as shown in FIG. 1A.

Incidentally, functions similar to the encoding section 101, low-order modulation section 102, frequency domain transform section 103, partial spectrum selection section (narrow-band transmission filter) 104, and time domain transform section 105 included in the transmitting device can also be implemented by executing respective programs on a program-controlled processor such as a CPU.

2.2) Receiving Device

A receiving device generates a symbol replica in the frequency domain from a decoding result. In the frequency domain, residual multipath interference and, of intersymbol interference due to partial spectrum selection, the intersymbol interference of those symbols that are distant from a decision symbol point are eliminated. In the time domain, those symbols that are near the decision symbol point are separated by sequence estimation. Particularly of the intersymbol interference due to partial spectrum selection, the intersymbol interference of the symbols near the decision symbol point, which cannot be eliminated in the frequency domain upon the initial receipt, is separated in the time domain by sequence estimation. Thereby, the characteristics at the time of initial receipt can be significantly improved.

Figure 5:
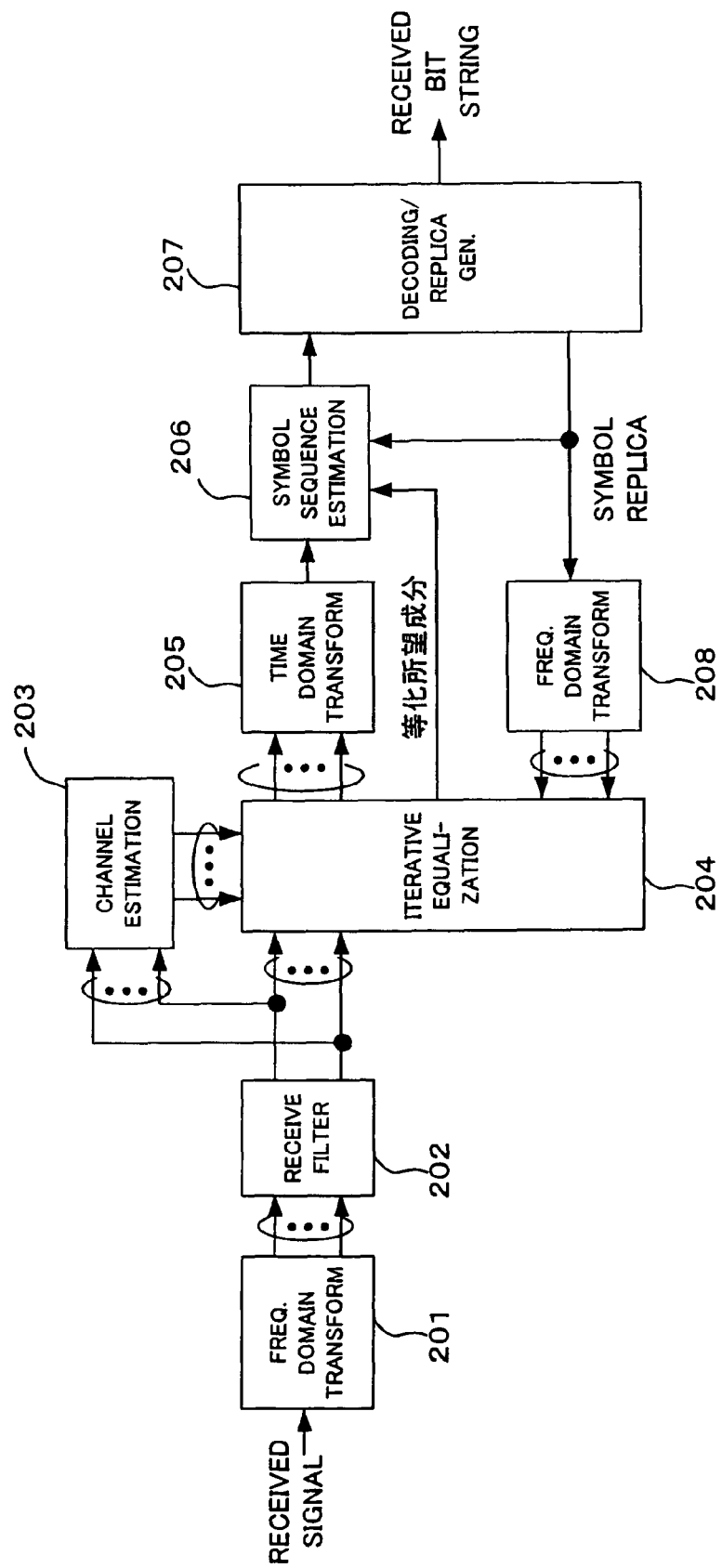
FIG. 5 is a block diagram showing a schematic configuration of a receiving device in the communication system according to the first example of the present invention.

FIG. 5 is a block diagram showing a schematic configuration of the receiving device in the communication system according to the first example of the present invention. The receiving device includes a frequency domain transform section 201, a reception filter 202, a channel estimation section 203, an iterative equalization section 204, a time domain transform section 205, a symbol sequence estimation section 206, a decoding/replica generation section 207, and a frequency domain transform section 208.

The frequency domain transform section 201 transforms a received signal from the time domain into the frequency domain and outputs the frequency-domain signal to the reception filter 202. The reception filter 202 performs symbol waveform shaping and noise suppression by subjecting the frequency-domain signal input from the frequency domain transform section 201 to filtering processing and then outputs the resultant signal to each of the channel estimation section 203 and iterative equalization section 204. For the reception filter 202, a raised-cosine roll-off filter for a 1/B band of the Nyquist band is used, for example.

The channel estimation section 203 extracts a reference signal from the frequency-domain received signal input from the reception filter 202 and calculates channel estimated values by calculating the correlation with a preset reference signal. The calculated channel estimated values are output to the iterative equalization section 204.

The iterative equalization section 204 equalizes the frequency-domain received signal input from the reception filter 202 by using equalization weights based on the channel estimated values given from the channel estimation section 203. Moreover, the iterative equalization section 204 eliminates interference components from the equalized received signal by spectrum reproduction using an under-mentioned symbol replica input from the frequency domain transform section 208 and then outputs the interference-eliminated received signal to the time domain transform section 205. In addition, the iterative equalization section 204 outputs an equalization desired component, which is the average value of post-equalization channel gains, to the symbol sequence estimation section 206, which will be described later.

The time domain transform section 205 receives the interference-eliminated signal from the iterative equalization section 204 as input, transforms the signal from the frequency domain into the time domain, and outputs the time-domain signal to the symbol sequence estimation section 206.

The symbol sequence estimation section 206 receives the time-domain signal from the time domain transform section 205 as input, separates those symbols near the decision symbol point by sequence estimation, and outputs a soft decision signal to the decoding/replica generation section 207. To reduce the amount of operation, the symbol sequence estimation section 206 may be configured to perform the sequence estimation only at the time of initial receipt.

The decoding/replica generation section 207 decodes the time-domain signal input from the symbol sequence estimation section 206 and outputs the signal as a received bit string. Moreover, the decoding/replica generation section 207 generates a time-domain symbol replica by using the decoding result, that is, the information bits and parity bit whose reliability has been improved by the decoding, and then outputs the time-domain symbol replica to each of the frequency domain transform section 208 and symbol sequence estimation section 206.

The frequency domain transform section 208 transforms the symbol replica input from the decoding/replica generation section 207 from the time domain into the frequency domain and outputs the frequency-domain symbol replica to the iterative equalization section 204.

Incidentally, functions similar to the frequency domain transform section 201, reception filter 202, channel estimation section 203, iterative equalization section 204, time domain transform section 205, symbol sequence estimation section 206, decoding/replica generation section 207, and frequency domain transform section 208 included in the receiving device can also be implemented by executing respective programs on a program-controlled processor such as a CPU.

Hereinafter, a more detailed description will be given of the iterative equalization section 204 and the symbol sequence estimation section 206.

2.3) Iterative Equalization Section

Figure 6:
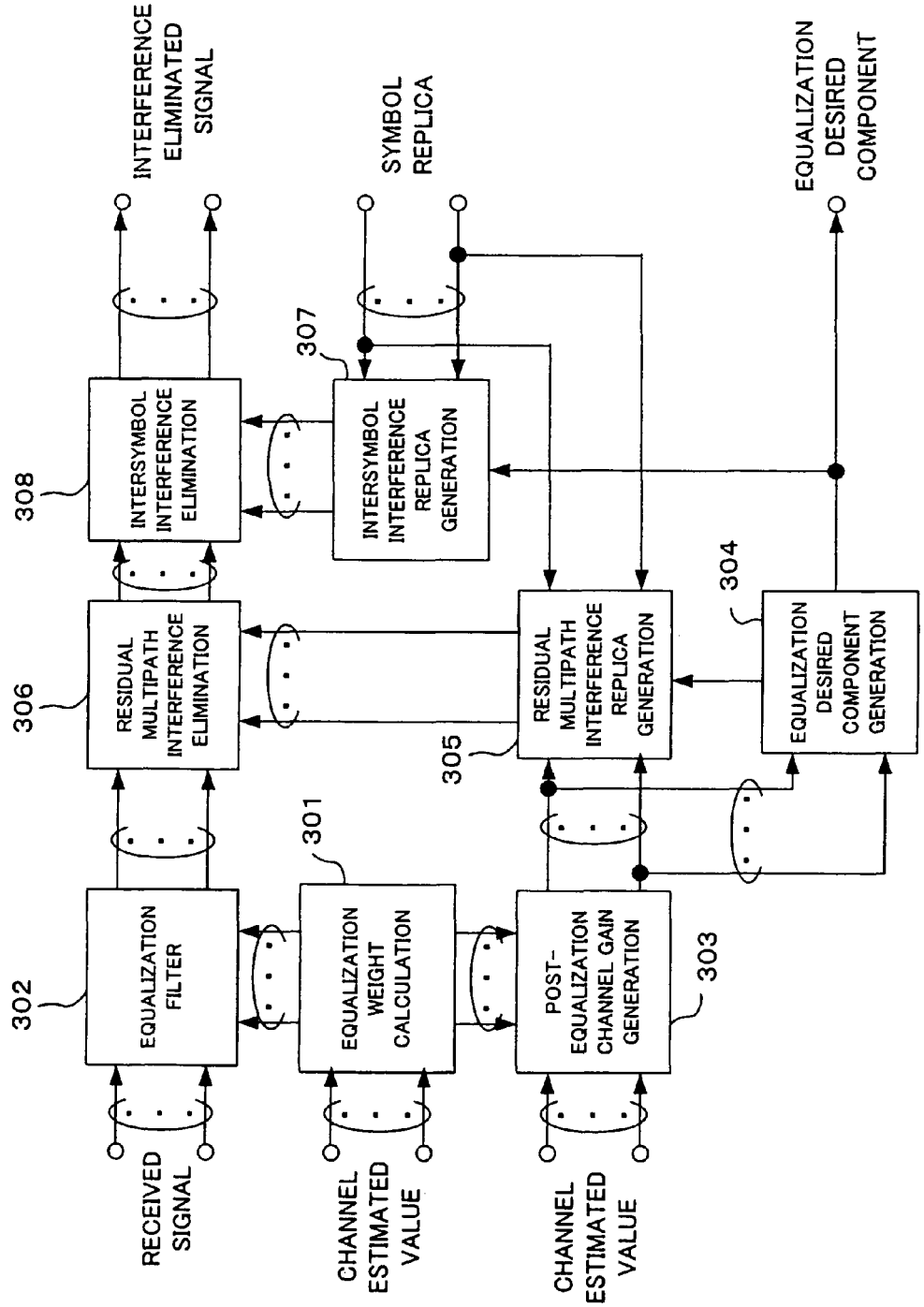
FIG. 6 is a block diagram showing an example of the detailed functional configuration of an iterative equalization section in the receiving device shown in FIG. 5.

FIG. 6 is a block diagram showing an example of the detailed functional configuration of the iterative equalization section 204 in the receiving device shown in FIG. 5. The iterative equalization section 204 equalizes a received signal and also eliminates, by using a symbol replica, residual multipath interference in the equalized signal and intersymbol interference due to partial spectrum selection performed at a transmitting device.

The iterative equalization section 204 includes an equalization weight calculation section 301, an equalization filter 302, a post-equalization channel gain generation section 303, an equalization desired component generation section 304, a residual multipath interference replica generation section 305, a residual multipath interference elimination section 306, an intersymbol interference replica generation section 307, and an intersymbol interference elimination section 308.

The equalization weight calculation section 301 receives the channel estimated values from the channel estimation section 203 as input and calculates equalization weights. The calculated equalization weights are output to each of the equalization filter 302 and the post-equalization channel gain generation section 303. For the calculation by the equalization weight calculation section 301, a zero-forcing method or minimum mean square error (MMSE) method is used, in general. When MMSE is used, the equalization weight $W^{(i)}$ (k') for a transmission subcarrier k' (k'=1, 2, . . . ) and iteration=i (i=1, 2, . . . ) is expressed by the following equation (1):

$$W^{(i)}(k') = \frac{H^*(k')}{|H(k')|^2 \rho^{(i)} + \sigma^2} \quad (1)$$

where H(k'), $\rho^{(i)}$, and $\sigma^2$ represent the estimated value of the transmission subcarrier k' channel, the residual interference power coefficient for iteration=i, and noise power, respectively. Note that a superscript "*" indicates complex conjugate. Moreover, the residual interference power coefficient, $\rho^{(i)}$, is defined by the following equation (2):

$$\rho^{(i)} = 1 - \frac{1}{T}\sum_{t=1}^{T} |\hat{s}^{(i-1)}(t)|^2 \quad (2)$$

where T represents the number of symbols in the time domain, and $\hat{S}^{(i-1)}(t)$ represents a time-domain symbol replica.

Note that the residual interference power coefficient at the time of first equalization $\rho^{(1)}$=1. As the reliability of the symbol replica increases, $\rho^{(i)}$ decreases toward zero, and the equalization weights are generated according to a criterion which is changed from MMSE criterion to maximal ratio combining (MRC) criterion.

The equalization filter 302 receives as input the frequency-domain received signal from the reception filter 202 and equalization weights from the equalization weight calculation section 301, and multiplies the received signal, for respective subcarriers, by the equalization weights, thereby equalizing the received signal so that the received signal corresponds to the transmit spectrum at the transmitting device. This equalized received signal is output to the residual multipath interference elimination section 306.

The post-equalization channel gain generation section 303 receives as input the channel estimated values and equalization weights from the channel estimation section 203 and the equalization weight calculation section 301, respectively, and generates post-equalization channel gains. The post-equalization channel gains are output to each of the equalization desired component generation section 304 and residual multipath interference replica generation section 305.

The equalization desired component generation section 304 receives the post-equalization channel gains from the post-equalization channel gain generation section 303 as input, calculates an equalization desired component, which is the average value of the post-equalization channel gains, and outputs the equalization desired component to each of the residual multipath interference replica generation section 305, intersymbol interference replica generation section 307, and symbol sequence estimation section 206. The equalization desired component for iteration=i is expressed by the following equation (3):

$$A^{(i)} = \frac{1}{K_{TX}} \sum_{k' \in K'} W^{(i)}(k')H(k') \quad (3)$$

where $K_{TX}$ represents the number of transmission subcarriers, and K' represents a set of elements each being the transmission subcarriers.

The residual multipath interference replica generation section 305 receives as input the post-equalization channel gains, equalization desired component, and a frequency-domain symbol replica from the post-equalization channel gain generation section 303, equalization desired component generation section 304, and frequency domain transform section 208, respectively, and generates a residual multipath interference replica. The generated residual multipath interference replica is output to the residual multipath interference elimination section 306.

The residual multipath interference elimination section 306 receives as input the equalized signal and residual multipath interference replica from the equalization filter 302 and residual multipath interference replica generation section 305, respectively, and subtracts the residual multipath interference replica from the equalized signal, thereby eliminating interference. The equalized signal from which the residual multipath interference has been eliminated is output to the intersymbol interference elimination section 308. The equalized signal $\hat{R}^{(i)}(k')$ after the residual multipath interference elimination for the transmission subcarrier k' and i iteration(s) is expressed by the following equation (4):

$$\hat{R}^{(i)}(k')=W^{(i)}(k')R(k')-(W^{(i)}(k')H(k')-A^{(i)})\hat{S}^{(i-1)}(k') \quad (4)$$

where R(k') represents a received signal of the transmission subcarrier k', and $\hat{S}^{(i-1)}(k')$ represents a post-decoding symbol replica for the transmission subcarrier k' and iteration=(i-1).

The intersymbol interference replica generation section 307 receives as input the equalization desired component and frequency-domain symbol replica from the equalization desired component generation section 304 and frequency domain transform section 208, respectively, and generates an intersymbol interference replica. The generated intersymbol interference replica is output to the intersymbol interference elimination section 308.

The intersymbol interference elimination section 308 receives as input the equalized signal from which the residual multipath interference has been eliminated and the intersymbol interference replica from the residual multipath interference elimination section 306 and intersymbol interference replica generation section 307, respectively, and reproduces, by using the replica, the spectra that the transmitting device has not transmitted, thereby eliminating intersymbol interference. The signal from which the intersymbol interference has been thus eliminated is output to the time domain transform section 205. The signal $\tilde{R}^{(i)}(k)$ after the intersymbol interference elimination for a subcarrier k and iteration=i is expressed by the following equation (5):

$$\tilde{R}^{(i)}(k)=\hat{R}^{(i)}(k)+(1-G(k))A^{(i)}\hat{S}^{(i-1)}(k) \quad (5)$$

where G(k) represents a characteristic of the transmission/reception filter in the frequency domain, which is, for example, the raised-cosine roll-off characteristic.

2.4) Symbol Sequence Estimation Section 2.4.1) Configuration

Figure 7:
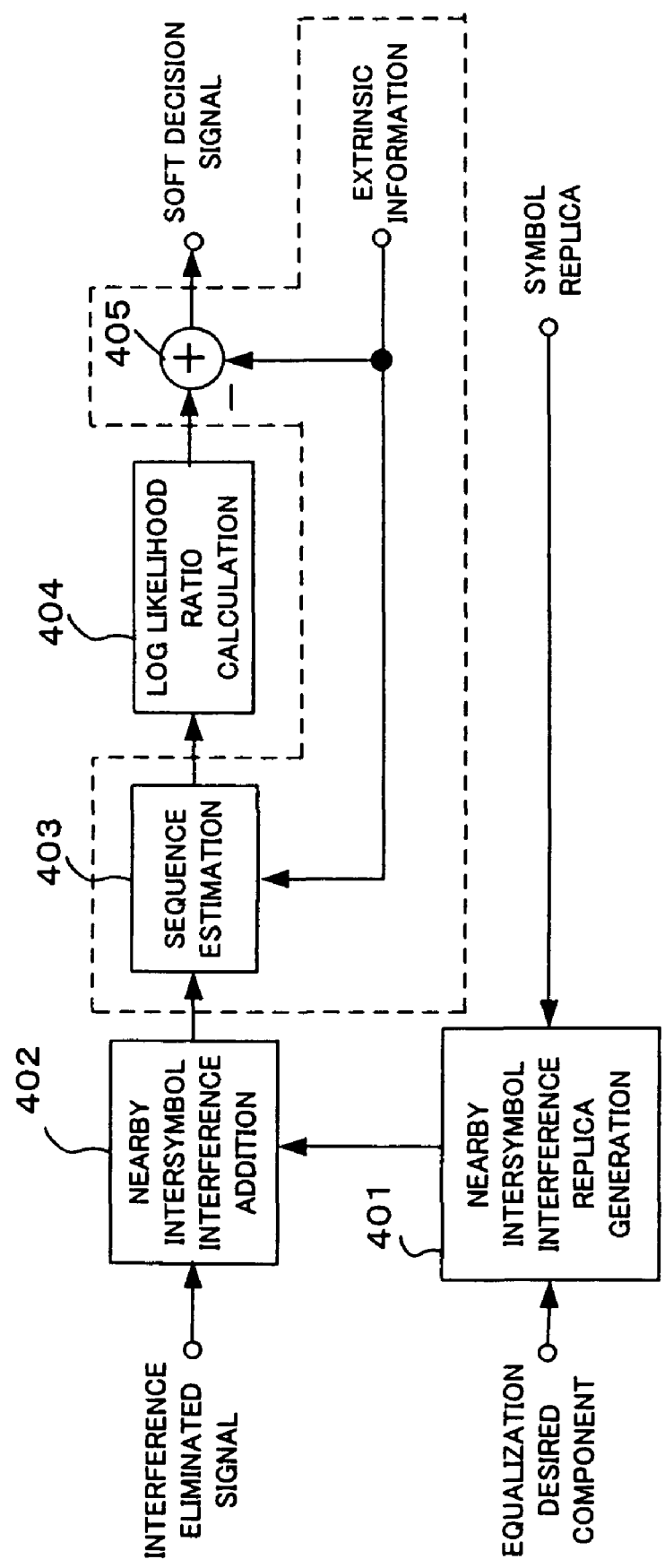
FIG. 7 is a block diagram showing an example of the detailed functional configuration of a symbol sequence estimation section in the receiving device shown in FIG. 5.

FIG. 7 is a block diagram showing an example of the detailed functional configuration of the symbol sequence estimation section 206 in the receiving device shown in FIG. 5. The symbol sequence estimation section 206 includes a nearby intersymbol interference replica generation section 401, a nearby intersymbol interference addition section 402, a sequence estimation section 403, and a log likelihood ratio calculation section 404.

The nearby intersymbol interference replica generation section 401 receives as input the equalization desired component from the iterative equalization section 204 and the time-domain symbol replica from the decoding/replica generation section 207 and generates a nearby intersymbol interference replica, which is a replica of the interference of those symbols near the decision symbol point. The generated nearby intersymbol interference replica is output to the nearby intersymbol interference addition section 402.

The nearby intersymbol interference addition section 402 receives as input the interference-eliminated signal from the time domain transform section 205 and nearby intersymbol interference replica from the nearby intersymbol interference replica generation section 401, adds the nearby intersymbol interference replica to the interference-eliminated signal, and outputs the resultant signal to the sequence estimation section 403. More specifically, of the intersymbol interferences eliminated by the iterative equalization section 204, the interference of those symbols near the decision symbol point is added back to the interference-eliminated signal, and the signal with the nearby intersymbol interference added back thereto is output to the sequence estimation section 403. Note that upon the initial receipt, since no intersymbol interference is eliminated by the iterative equalization section 204, control is made such that the nearby intersymbol interference addition section 402 do not perform the processing for adding back the nearby intersymbol interference.

The sequence estimation section 403 receives the signal with the nearby intersymbol interference added back thereto from the nearby intersymbol interference addition section 402 as input and separates the symbols near the decision symbol point by sequence estimation, thereby selecting a maximum-likelihood transmission symbol sequence. The sequence estimation section 403 then outputs likelihood information regarding the selected transmission symbol sequence to the log likelihood ratio calculation section 404. The sequence estimation section 403 may use the maximum a posteriori probability (MAP) algorithm, Max-Log-MAP algorithm, soft output Viterbi algorithm (SOVA), or the like.

SOVA is a simplified algorithm in which the index calculation, addition, and logarithmic calculation in the MAP algorithm are represented by addition, comparison, and selection processing (ACS: Add-Compare-Select), respectively, and is widely used for equalization and decoding processing.

2.4.2) Operation

Hereinafter, a description will be given of the sequence estimation operation in a case where SOVA is used at the sequence estimation section 403. Here, binary phase shift keying (BPSK) is assumed as a modulation scheme used, and it is defined that a modulated symbol $S_n \in \{1, -1\}$ and that $S_n = (S_{n-L+1}, S_{n-L+2}, \ldots, S_n)$ where $S_n$ is a state at time n in Trellis with a memory length of L.

Figure 8:
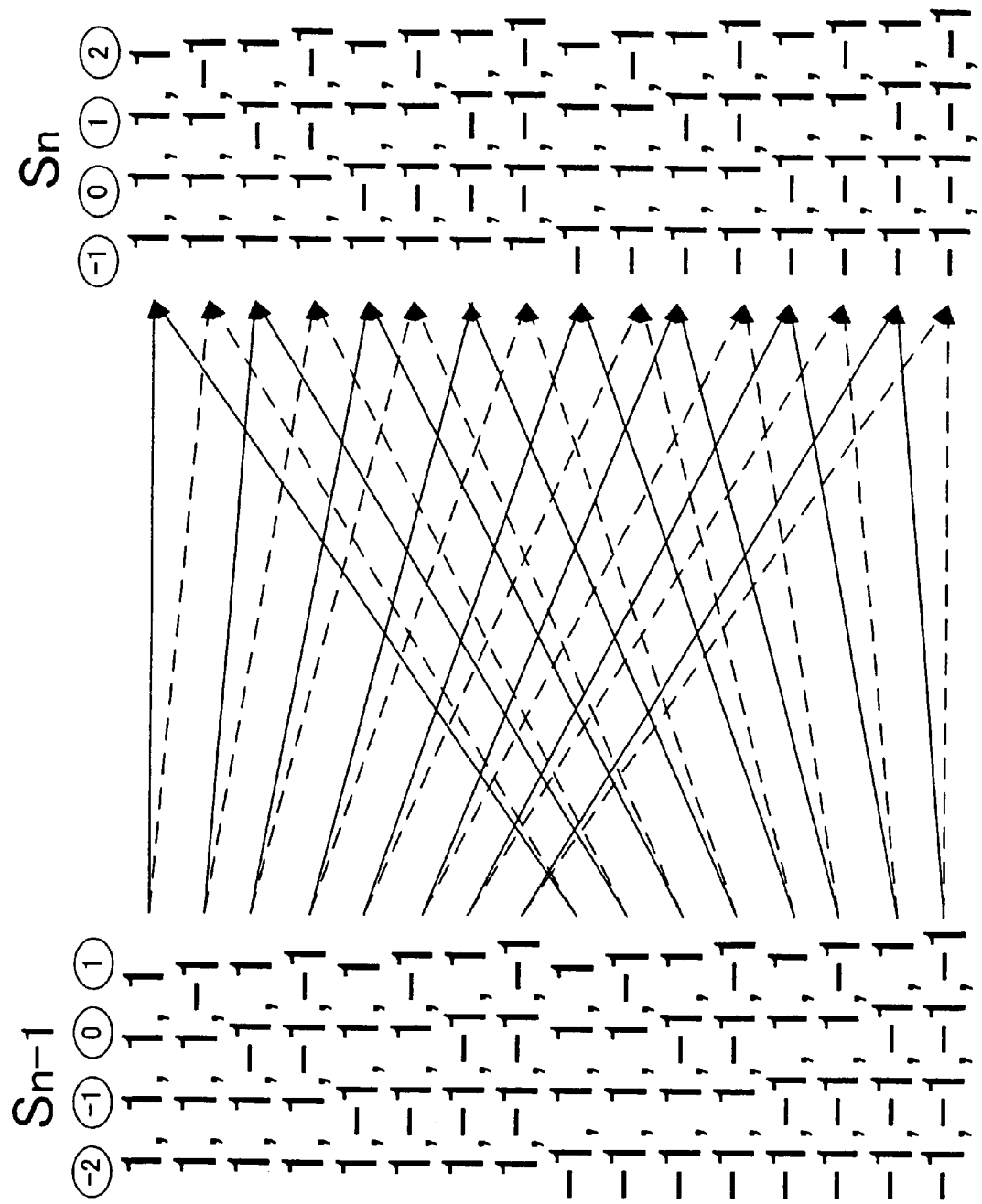
FIG. 8 is a diagram of trellis state transition at a sequence estimation section of the symbol sequence estimation section when L=4 (the number of states is 16).

FIG. 8 is a diagram of trellis state transitions at the sequence estimation section 403 when L=4 (the number of states is 16). FIG. 8 corresponds to the sequence estimation processing shown in FIG. 3 and shows the trellis state transitions from a state $S_{n-1}$=(Symbol −2, Symbol −1, Symbol 0, Symbol 1) to a state $S_n$=(Symbol −1, Symbol 0, Symbol 1, Symbol 2). Note that trellis state transition can be similarly depicted even when QPSK is assumed as a modulation scheme used.

Referring to FIG. 8, where the latest symbol 2 is "1," transitions are made as indicated by solid lines, and where the latest symbol 2 is "−1," transitions are made as indicated by broken lines. The likelihood of a survivor path in the state Sn according to Viterbi algorithm is expressed by the following equation (6):

$$\Gamma(S_n) = \min_{\{S_{n-1}\}} (\Gamma(S_{n-1}) + \lambda(S_{n-1}, S_n)) \quad (6)$$

where $\lambda(S_{n-1}, S_n)$ represents the branch likelihood for the states $S_{n-1}, S_n$ and is expressed by the following equation (7):

$$\lambda(S_{n-1}, S_n) = \frac{\left| r_{n-L/2} - A^{(i)} \sum_{j=0}^{L} g_{j-L/2} s_{n-j} \right|^2}{2\sigma^2} \quad (7)$$

where $r_{n-L/2}$ is a signal with the nearby intersymbol interference added back thereto, and $g_{j-L/2}$ is the impulse response of each symbol. The impulse response $g_{j-L/2}$ represents, for example, the raised-cosine roll-off characteristic with a roll-off factor $\alpha$ and is expressed by the following equation (8):

$$g_j = \frac{\sin \pi (j/B)}{\pi(j/B)} \frac{\cos \alpha \pi (j/B)}{1 - (2\alpha(j/B))^2}. \quad (8)$$

However, aliasing occurs to a signal actually transformed into the time domain. Therefore, apart from the method of calculating $g_j$ using the above equation (8), a method is also conceivable in which $g_j$ is obtained by transforming the raised-cosine roll-off characteristic into the time domain.

At the time of initial receipt, intersymbol interference is not eliminated by the iterative equalization section 204. Accordingly, such a configuration is also conceivable that a delayed decision feedback sequence estimator (DDFSE) is used to eliminate past intersymbol interference using a decision symbol. The branch likelihood for the states $S_{n-1}, S_n$ in the case of using DDFSE is expressed by the following equation (9):

$$\lambda(S_{n-1}, S_n) = \frac{\left| r_{n-L/2} - A^{(i)} \sum_{j=0}^{L} g_{j-L/2} s_{n-j} - A^{(i)} \sum_{j=L+1}^{L'} g_{j-L/2} \hat{s}_{n-j} \right|^2}{2\sigma^2} \quad (9)$$

where L' represents the length of a symbol whose interference is to be eliminated using the decision symbol, and $\hat{S}_{n-i}$ represents a symbol sequence for a survivor path in the state $S_{n-1}$. Moreover, since an output from the time domain transform section 205 is a cyclic signal, future intersymbol interference can also be eliminated using the previous decision symbol, by cyclically performing the sequence estimation multiple times.

The log likelihood ratio calculation section 404 receives likelihood information regarding a transmission symbol sequence from the sequence estimation section 403 as input, calculates the log likelihood ratio for each bit, and outputs the log likelihood ratio of each bit to the decoding/replica generation section 207 as a soft decision signal. The log likelihood ratio of a bit p at time (n−L) is expressed by the following equation (10), using the likelihood information on a survivor candidate path:

$$L(b_{n-L,p}) = \min_{\{S_{n-1}, S_n\} | b_{n-L,p}=-1} (\Gamma(S_{n-1}) + \lambda(S_{n-1}, S_n)) - \min_{\{S_{n-1}, S_n\} | b_{n-L,p}=1} (\Gamma(S_{n-1}) + \lambda(S_{n-1}, S_n)) \quad (10)$$

Moreover, the symbol sequence estimation section 206 receives extrinsic information as input from the decoding/replica generation section 207 and allows the sequence estimation section 403 to use the extrinsic information as a priori information, whereby accuracy in the sequence estimation can be increased. In this case, a subtractor 405 is additionally provided to the output side of the log likelihood ratio calculation section 404, and the extrinsic information is subtracted. The specific operation thereof is as follows.

The sequence estimation section 403 receives as input the signal with the nearby intersymbol interference added back thereto and the extrinsic information (a priori information) from the nearby intersymbol interference addition section 402 and decoding/replica generation section 207, respectively, separates those symbols near the decision symbol point by sequence estimation, and selects a maximum-likelihood transmission symbol sequence. The sequence estimation section 403 outputs likelihood information regarding the selected maximum-likelihood transmission symbol sequence to the log likelihood ratio calculation section 404. The branch likelihood for the states $S_{n-1}, S_n$ is expressed by the following equation (11), using the a priori information on the symbol at time (n−L/2):

$$\lambda(S_{n-1}, S_n) = \frac{\left| r_{n-L/2} - A^{(i)} \sum_{j=0}^{L} g_{j-L/2} s_{n-j} \right|^2}{2\sigma^2 - L(s_{n-L/2})} \quad (11)$$

where $L(S_{n-L/2})$, which is the a priori information on the symbol at time (n−L/2), is calculated by summing the log likelihood ratios of "1" bits included in the symbol and is expressed by the following equation (12):

$$L(s_{n-L/2}) = \frac{\prod_p P(b_{n-L/2,p} = s_{n-L/2}(p))}{\prod_p P(b_{n-L/2,p} = -1)} = \sum_{s_{n-L/2}(p)=1} L(b_{n-L/2,p}) \quad (12)$$

The subtractor 405 receives as input the log likelihood ratio of each bit and extrinsic information (a priori information) from the log likelihood ratio calculation section 404 and decoding/replica generation section 207, respectively, and calculates the difference between them. The thus obtained log likelihood ratio of each bit from which the a priori information has been subtracted is output as a soft decision signal to the decoding/replica generation section 207.

The above description is given on the assumption that the processing by the symbol sequence estimation section 206 is done by complex number operation. However, since channel phase synchronization is established in signals supplied from the time domain transform section 205, for example, in a case of QPSK signal, signals containing intersymbol interference on I and Q axes of a complex plane are orthogonal to each other. Therefore, sequence estimation can be performed by real number operation on the I axis and on the Q axis independently. Thus, the number of trellis states can be greatly reduced. The branch likelihood for the states $S_{n-1}$, $S_n$ on the I axis is expressed by the following equation (13):

$$\lambda_I(S_{n-1}, S_n) = \frac{\left(\text{Re}[r_{n-L/2}] - \frac{A^{(i)}}{\sqrt{2}} \sum_{j=0}^{L} g_{j-L/2} s'_{n-j}\right)^2}{\sigma^2} \quad (13)$$

Here, a modulated symbol $s'_n \in \{1, -1\}$ is a BPSK signal obtained by projecting a QPSK signal onto the I axis. The branch likelihood on the Q axis can be similarly calculated.

2.5) Decoding/Replica Generation Section

Figure 9:
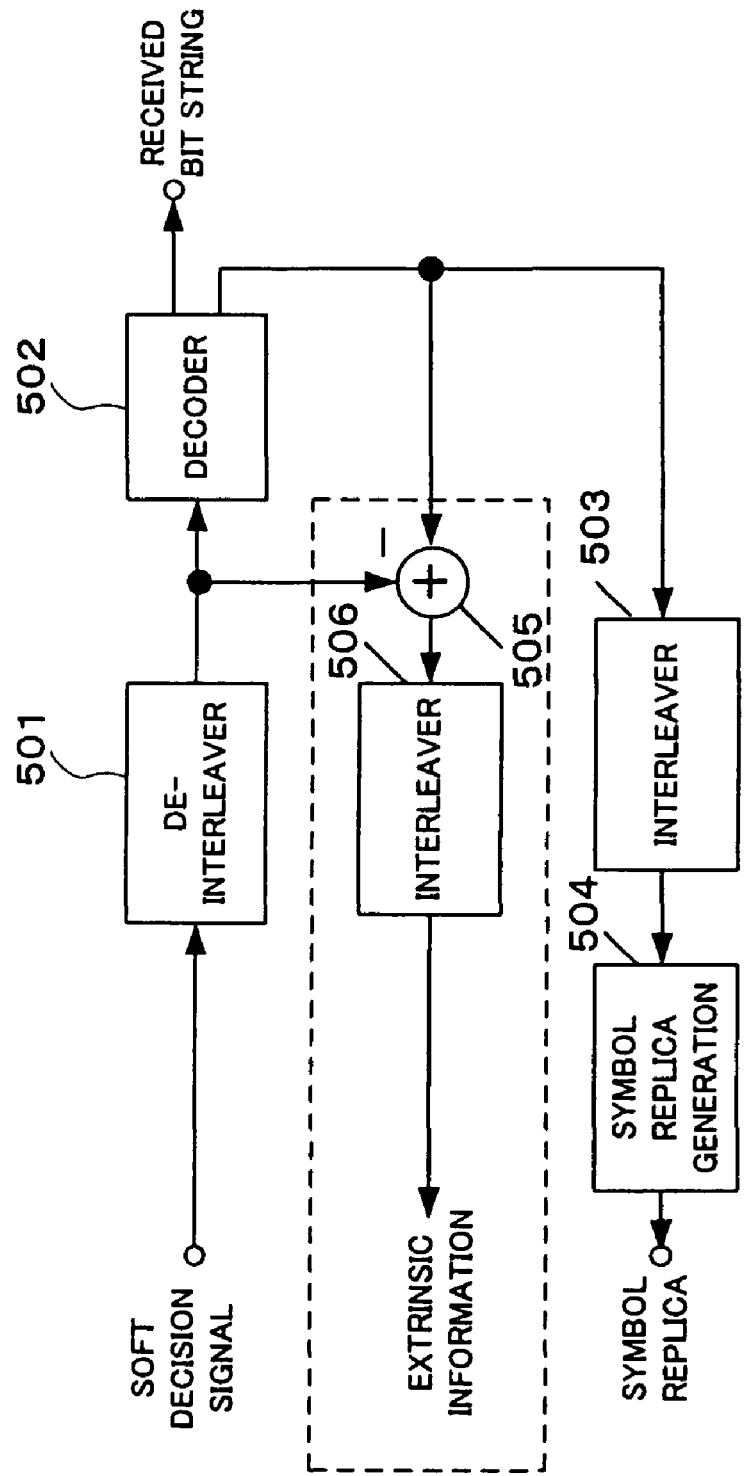
FIG. 9 is a block diagram showing an example of the detailed functional configuration of a decoding/replica generation section in the receiving device shown in FIG. 5.

FIG. 9 is a block diagram showing an example of the detailed functional configuration of the decoding/replica generation section 207 in the receiving device shown in FIG. 5. The decoding/replica generation section 207 includes a de-interleaver 501, a decoder 502, an interleaver 503, and a symbol replica generation section 504.

The de-interleaver 501 receives the soft decision signal from the symbol sequence estimation section 206 as input, de-interleaves the log likelihood ratio of each bit, and outputs the de-interleaved log likelihood ratios to the decoder 502.

The decoder 502 performs processing for decoding the log likelihood ratio of each bit input from the de-interleaver 501 and outputs to the interleaver 503 the log likelihood ratios of the information bits and parity bit whose reliability has been increased by the decoding.

The interleaver 503 receives the log likelihood ratio of each bit after the decoding from the decoder 502 as input, interleaves the log likelihood ratio of each bit, and outputs the interleaved log likelihood ratios to the symbol replica generation section 504.

The symbol replica generation section 504 receives the log likelihood ratio of each bit from the interleaver 503 as input, generates a symbol replica, and outputs the generated symbol replica to the frequency domain transform section 208. In a case where the modulation scheme is QPSK for example, a symbol replica $\hat{S}^{(i-1)}(t)$ of a time-domain symbol t for iteration=(i-1) is represented by the following equation (14):

$$\hat{s}^{(i-1)}(t) = \frac{1}{\sqrt{2}} \hat{b}^{(i-1)}(2t) + j \frac{1}{\sqrt{2}} \hat{b}^{(i-1)}(2t+1). \quad (14)$$

Moreover, in a case where the modulation scheme is 16 QAM for example, the symbol replica is represented by the following equation (15):

$$\hat{s}^{(i-1)}(t) = \frac{1}{\sqrt{10}} \hat{b}^{(i-1)}(4t)(2 - \hat{b}^{(i-1)}(4t+2)) + \quad (15)$$
$$j \frac{1}{\sqrt{10}} \hat{b}^{(i-1)}(4t+1)(2 - \hat{b}^{(i-1)}(4t+3))$$

where $\hat{b}^{(i-1)}(p)$ represents a bit replica of a bit p included in the symbol and is expressed by the following equation (16):

$$\hat{b}^{(i-1)}(p) = \tanh\left(\frac{b^{(i-1)}(p)}{2}\right) \quad (16)$$

where $b^{(i-1)}(p)$ represents the log likelihood ratio of the bit p.

Moreover, the decoding/replica generation section 207 can also generate extrinsic information and output it to the symbol sequence estimation section 206 when necessary, with a subtractor 505 and an interleaver 506 additionally provided.

The subtractor 505 calculates the difference between the log likelihood ratio of each bit input from the de-interleaver 501 and the post-decoding log likelihood ratio of each bit input from the decoder 502, thereby extracting the extrinsic information. The interleaver 506 interleaves the extrinsic information on each bit input from the subtractor 505 and outputs the interleaved extrinsic information to the symbol sequence estimation section 206.

2.6) Advantages

As described above, according to the first example of the present invention, when a received SINR is good, a signal is modulated not by using high-order modulation, which produces a relatively small distance between signal points, but by using low-order modulation, which produces a relatively large distance between signal points, and a partial spectrum, which is a portion of a spectrum generated in a wide band, is selected and transmitted. Intersymbol interference due to non-transmitted spectrum is separated at the receiving device by interference elimination or sequence estimation. Thus, it is possible to achieve high-speed radio transmission of a single-carrier signal tolerant of residual multipath interference with as good frequency use efficiency as before.

3. Second Example

The above-described first example illustrates a case where single input single output (SISO) communication is performed using partial spectrum transmission. However, the present invention is not limited to this case. As will be described next, the present invention can also be applied to a case where multiple input multiple output (MIMO) multiplexing communication is performed using partial spectrum communication. In the uplink of next generation mobile communication, expectations are placed on the multi-user MIMO communication, to increase cell throughput. In the multi-user MIMO communication, multiple users simultaneously transmit data signals at the same frequency.

Figure 10:
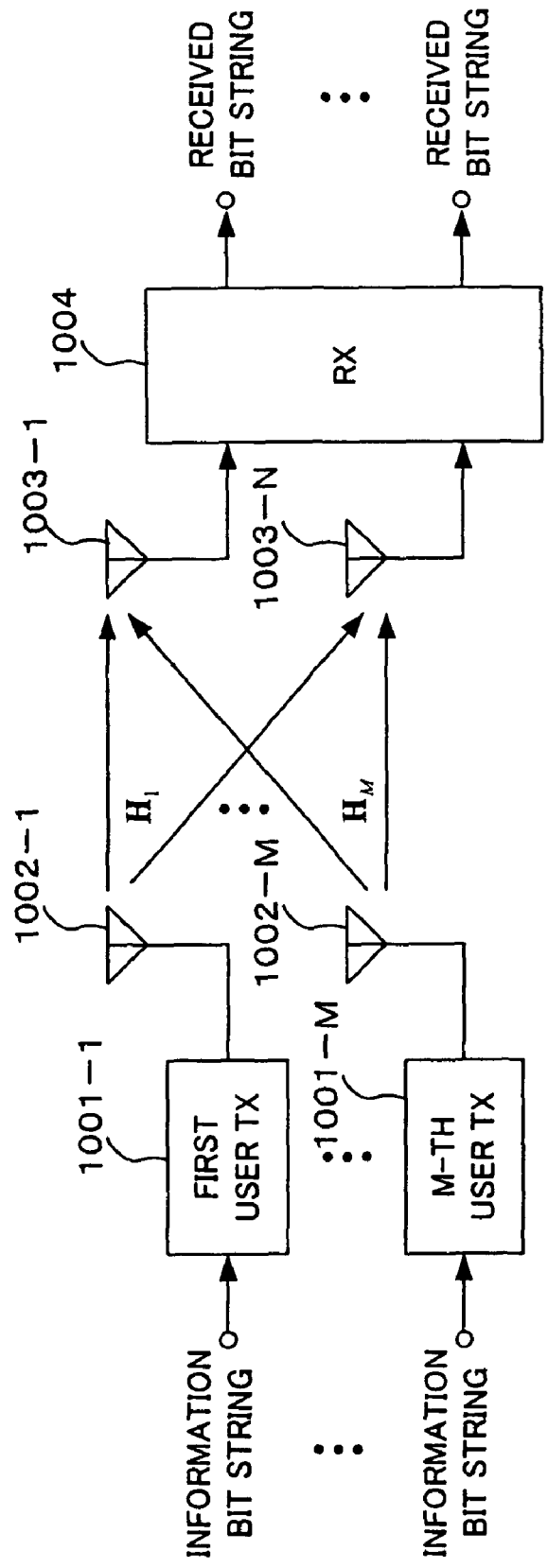
FIG. 10 is a block diagram showing a configuration of a multi-user MIMO communication system.

FIG. 10 is a block diagram showing a configuration of a multi-user MIMO communication system. Assuming that M (M is an integer not smaller than two) is the number of users or transmitting antennas that transmit simultaneously, transmitting devices 1001-1 to 1001-M of the users individually perform error correction coding and modulation of respective information bit strings. User transmitting antennas 1002-1 to 1002-M transmit their respective users' modulated signals by radio. Receiving antennas 1003-1 to 1003-N individually receive multiplexed signals of the individual users' transmission signals. A receiving device 1004 demultiplexes and decodes the individual users' data signals, performs error correction decoding, and outputs received bit strings.

In the multi-user MIMO communication system according to the second example shown in FIG. 10, it is assumed that each of the transmitting devices 1001-1 to 1001-M of the users has a configuration similar to the transmitting device shown in FIG. 4. That is, as described above, each transmitting device generates a transmission signal by encoding and low-order-modulating information bits, transforming them into a frequency-domain signal, performing partial spectrum selection or narrow-band transmission filtering processing, and then transforming the resultant signal into a time-domain signal.

The receiving device 1004 transforms the antenna-received signals into frequency-domain signals, estimates channels by processing in the frequency domain, equalizes the received signals, transforms the equalized signals into time-domain signals, and then decodes them. Further, the receiving device 1004 generates frequency-domain symbol replicas based on the respective decoding results and thereby eliminates, in the frequency domain, antenna interference, multipath interference, and, of intersymbol interference due to partial spectrum selection, the intersymbol interference of those symbols that are distant from a decision symbol point. The receiving device 1004 separates, of the intersymbol interference due to partial spectrum selection, those symbols that are near the decision symbol point in the time domain by sequence estimation. The following is a detailed description.

3.1) Receiving Device

Figure 11:
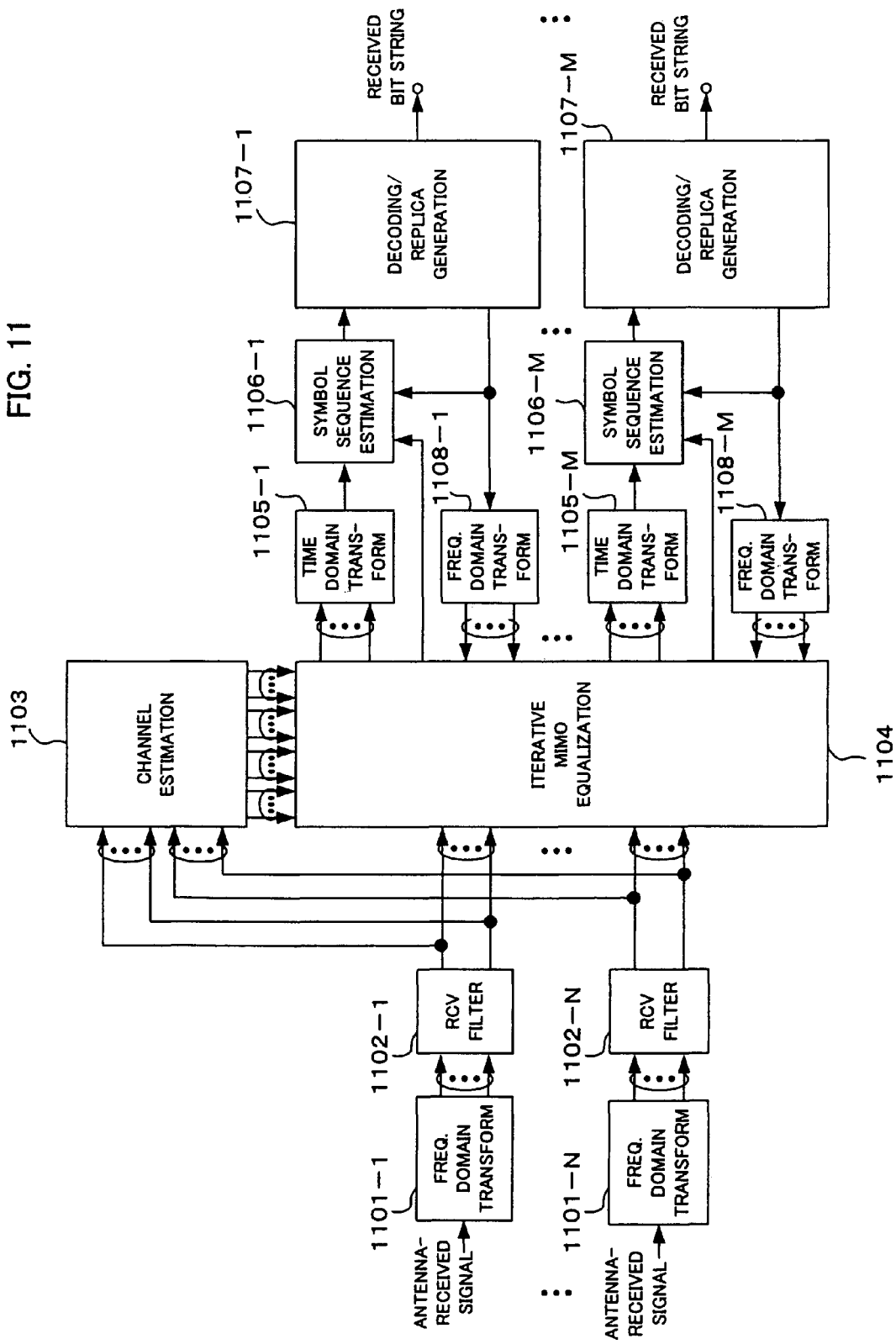
FIG. 11 is a block diagram showing a schematic configuration of a receiving device according to a second example of the present invention.

FIG. 11 is a block diagram showing a schematic configuration of the receiving device according to the second example of the present invention. The receiving device 1004 includes frequency domain transform sections 1101-1 to 1101-N, reception filters 1102-1 to 1102-N, a channel estimation section 1103, an iterative MIMO equalization section 1104, time domain transform sections 1105-1 to 1105-M, symbol sequence estimation sections 1106-1 to 1106-M, decoding/replica generation sections 1107-1 to 1107-M, and frequency domain transform sections 1108-1 to 1108-M.

The frequency domain transform sections 1101-1 to 1101-N receive respective antenna-received signals as input and, after transforming from the time domain into the frequency domain, output the frequency-domain signals to the reception filters 1102-1 to 1102-N, respectively.

The reception filters 1102-1 to 1102-N receive as input the frequency-domain received signals from the frequency-domain transform sections 1101-1 to 1101-N, respectively, perform symbol waveform shaping and noise suppression by filtering processing, and output the respective resultant signals to each of the channel estimation section 1103 and iterative MIMO equalization section 1104. For the reception filters 1102-1 to 1102-N, raised-cosine roll-off filters for the 1/B portion of the Nyquist band are used, for example.

The channel estimation section 1103 receives frequency-domain received reference signals from the reception filters 1102-1 to 1102-N as input and calculates a channel estimated value for each channel between the transmitting antennas and receiving antennas by calculating the correlation with a predetermined reference signal. The calculated channel estimated values are output to the iterative MIMO equalization section 1104.

The iterative MIMO equalization section 1104 receives as input the frequency-domain received signals from the reception filters 1102-1 to 1102-N, the channel estimated values from the channel estimation section 1103, and symbol replicas for the transmitting antennas from respective ones of the frequency domain transform section 1108-1 to 1108-M, and performs equalization and interference elimination. Specifically, an antenna-received signal is equalized using an equalization weight calculated based on the corresponding channel estimated value, which is the estimated value of the channel between the corresponding transmitting and receiving antennas. Then, using a symbol replica of the symbol for the transmitting antenna, antenna interference is eliminated from the received signal, and also residual multipath interference and, of intersymbol interference due to partial spectrum transmission, the intersymbol interference of those symbols distant from the decision symbol point are eliminated. The signals from which the interference has been thus eliminated are output to the time domain transform sections 1105-1 to 1105-M, respectively.

The time domain transform sections 1105-1 to 1105-M receive the interference-eliminated signals, respectively, from the iterative MIMO equalization section 1104 as input and, after transforming from the frequency domain into the time domain, output the time-domain signals to the symbol sequence estimation sections 1106-1 to 1106-M, respectively.

The symbol sequence estimation sections 1106-1 to 1106-M receive as input the time-domain signals from the time domain transform sections 1105-1 to 1105-M, respectively, separate those symbols near the decision symbol point by sequence estimation, and output soft decision signals to the decoding/replica generation sections 1107-1 to 1107-M, respectively. Note that to reduce the amount of operation, the symbol sequence estimation sections 1106-1 to 1106-M may be configured to perform the sequence estimation only at the time of initial receipt.

The decoding/replica generation sections 1107-1 to 1107-M decode the respective time-domain signals from the symbol sequence estimation sections 1106-1 to 1106-M and output the decoded signals as received bit strings, respectively. Moreover, the decoding/replica generation sections 1107-1 to 1107-M generate time-domain symbol replicas by using the information bits and parity bit whose reliability has been increased by the decoding, and output the generated symbol replicas to the frequency domain transform sections 1108-1 to 1108-M, respectively and to the symbol sequence estimation sections 1106-1 to 1106-M, respectively.

The frequency domain transform sections 1108-1 to 1108-M receive as input the time-domain symbol replicas from the decoding/replica generation sections 1107-1 to 1107-M, respectively, and, after transforming them into frequency-domain ones, output the respective frequency-domain symbol replicas to the iterative MIMO equalization section 1104.

3.2) Iterative MIMO Equalization Section

Figure 12:
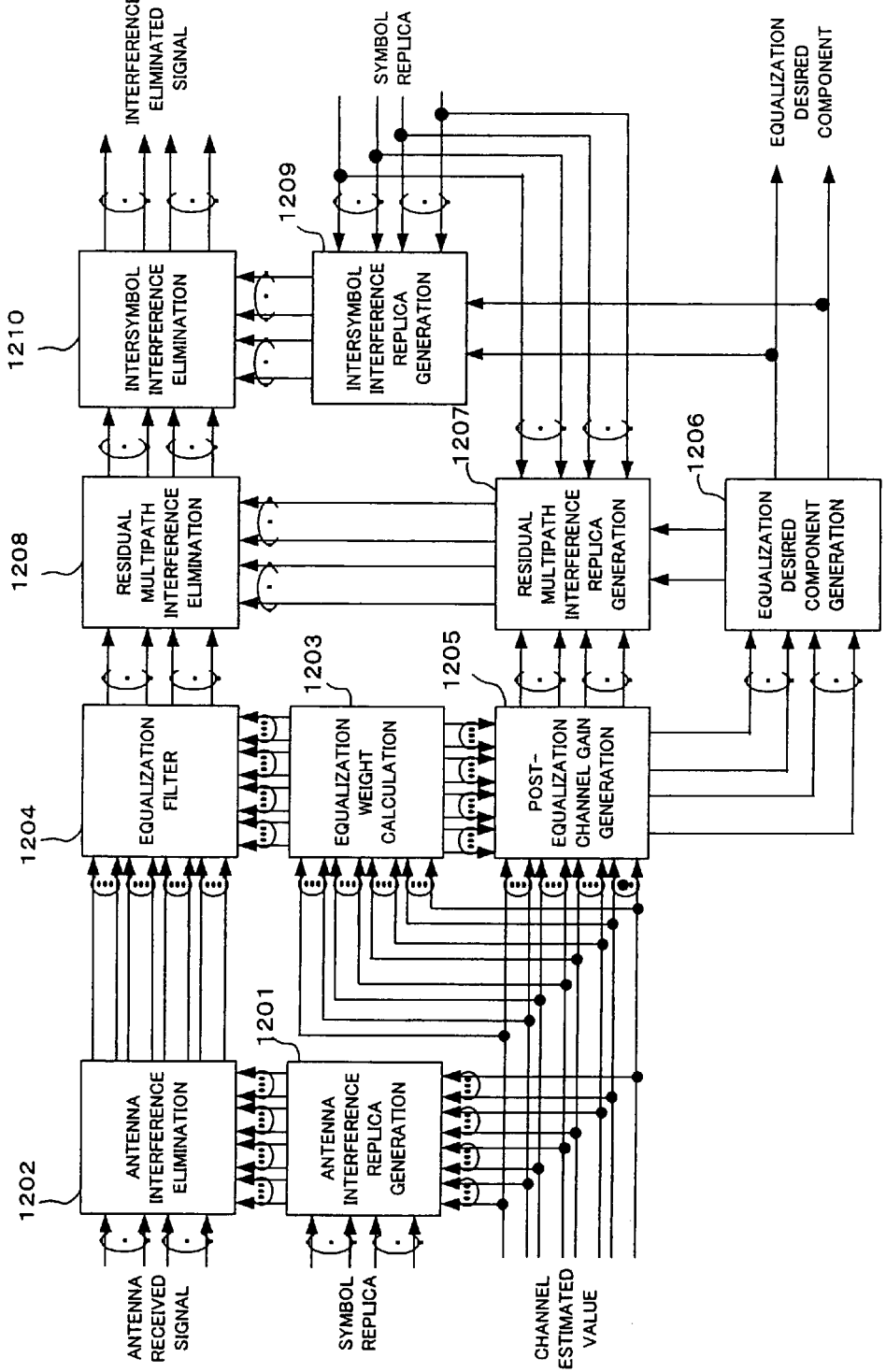
FIG. 12 is a block diagram showing a detailed functional configuration of an iterative MIMO equalization section in the receiving device shown in FIG. 11.

FIG. 12 is a block diagram showing a detailed functional configuration of the iterative MIMO equalization section 1104 in the receiving device shown in FIG. 11. The iterative MIMO equalization section 1104 includes an antenna interference replica generation section 1201, an antenna interference elimination section 1202, an equalization weight calculation section 1203, an equalization filter 1204, a post-equalization channel gain generation section 1205, an equalization desired component generation section 1206, a residual multipath interference replica generation section 1207, a residual multipath interference elimination section 1208, an intersymbol interference replica generation section 1209, and an intersymbol interference elimination section 1210.

The antenna interference replica generation section 1201 receives as input the channel estimated values from the channel estimation section 1103 and the symbol replicas for the transmitting antennas from respective ones of the frequency domain transform sections 1108-1 to 1108-M, generates antenna interference replicas, and outputs them to the antenna interference elimination section 1202.

The antenna interference elimination section 1202 receives as input the frequency-domain received signals from the reception filters 1102-1 to 1102-N and the antenna interference replicas from the antenna interference replica generation section 1201, eliminates interferences by subtracting the antenna interference replicas from the received signals, and outputs the signals from which the antenna interferences have been eliminated to the equalization filter 1204. A received signal vector, $R_m^{(i)}(k')$, after the antenna interference elimination for a transmitting antenna m (m=1, 2, . . . , M), a transmission subcarrier k', and iteration=i is expressed by the following equation (17):

$$R_m^{(i)}(k') = R(k') - \sum_{m'=1, m' \neq m}^{M} H_{m'}(k')\hat{S}_{m'}^{(i-1)}(k') \quad (17)$$

where R(k') represents an antenna-received signal vector for the transmission subcarrier k', $H_m(k')$ represents a channel estimated value vector for the transmission antenna m and transmission subcarrier k', and $\hat{S}_m^{(i-1)}(k')$ represents a post-decoding symbol replica for the transmitting antenna m, the transmission subcarrier k', and iteration=(i−1).

The equalization weight calculation section 1203 receives the channel estimated values from the channel estimation section 1103 as input, calculates equalization weights, and outputs them to each of the equalization filter 1204 and post-equalization channel gain generation section 1205. For the calculation by the equalization weight calculation section 1203, a zero-forcing method or minimum mean square error (MMSE) method is used, in general. When MMSE is used, an equalization weight vector, $Wm^{(i)}(k')$, for the transmitting antenna m, transmission subcarrier k', and iteration=1 is expressed by the following equation (18):

$$W_m^{(i)}(k') = H_m^H(k')[H(k)P^{(i)}H^H(k')+\sigma^2 I]^{-1} \quad (18)$$

where H(k') represents a matrix of channel estimated values for the transmission subcarrier k', $P^{(i)}$ represents a matrix of residual interference powers for iteration=1, and I represents a unit matrix. Note that a superscript "H" indicates Hermite transposition. Additionally, $P^{(i)}$, the residual interference power matrix, is expressed by the following equation (19):

$$P^{(i)} = \mathrm{diag}[\rho_1^{(i)}, \ldots, \rho_M^{(i)}] \quad (19)$$

where $\rho_m^{(i)}$ is a residual interference power coefficient for the transmitting antenna m and is represented by the following equation (20):

$$\rho_m^{(i)} = 1 - \frac{1}{T}\sum_{t=1}^{T}|\hat{s}_m^{(i-1)}(t)|^2 \quad (20)$$

where $\hat{S}_m^{(i-1)}(t)$ is a time-domain symbol replica for the transmitting antenna m. Incidentally, the residual interference power coefficient at the time of first equalization $\rho_m^{(1)}=1$.

The equalization filter 1204 receives as input the signals from which the antenna interferences have been eliminated from the antenna interference elimination section 1202 and the equalization weights from the equalization weight calculation section 1203, and multiplies the antenna-interference-eliminated signals, for respective subcarriers, by the equalization weights, thereby equalizing the received signals corresponding to the spectra that the transmitting devices have respectively transmitted. The thus equalized signals are output to the residual multipath interference elimination section 1208.

The post-equalization channel gain generation section 1205 receives as input the channel estimated values from the channel estimation section 1103 and the equalization weights from the equalization weight calculation section 1203, generates post-equalization channel gains, and outputs them to each of the equalization desired component generation section 1206 and residual multipath interference replica generation section 1207.

The equalization desired component generation section 1206 receives the post-equalization channel gains from the post-equalization channel gain generation section 1205 as input, calculates equalization desired components, each of which is the average value of the relevant post-equalization channel gains, and outputs the calculated equalization desired components to each of the residual multipath interference replica generation section 1207 and intersymbol interference replica generation section 1209. An equalization desired component for the transmitting antenna m and iteration=i is expressed by the following equation (21):

$$A^{(i)} = \frac{1}{K_{TX}} \sum_{k' \in K'} W_m^{(i)}(k')H_m(k'). \quad (21)$$

The residual multipath interference replica generation section 1207 receives as input the post-equalization channel gains from the post-equalization channel gain generation section 1205, the equalization desired components from the equalization desired component generation section 1206, and the symbol replicas for the transmitting antennas from respective ones of the frequency domain transform sections 1108-1 to 1108-M, generates residual multipath interference replicas, and outputs them to the residual multipath interference elimination section 1208.

The residual multipath interference elimination section 1208 receives as input the equalized signals from the equalization filter 1204 and the residual multipath interference replicas from the residual multipath interference replica generation section 1207 and eliminates interferences by subtracting the residual multipath interference replicas from the equalized signals. The equalized signals from which the residual multipath interferences have been thus eliminated are output to the intersymbol interference elimination section 1210. An equalized signal $\hat{R}_m^{(i)}(k')$ after the residual multipath interference elimination for the transmitting antenna m, transmission subcarrier k', and iteration=i is expressed by the following equation (22):

$$\hat{R}_m^{(i)}(k')=W_m^{(i)}(k')R_m^{(i)}(k')-(W_m^{(i)}(k')H_m(k')-A_m^{(i)})\hat{S}_m^{(i-1)}(k') \quad (22)$$

The intersymbol interference replica generation section 1209 receives as input the equalization desired components from the equalization desired component generation section 1206 and the symbol replicas for the transmitting antennas from respective ones of the frequency domain transform sections 1108-1 to 1108-M, generates intersymbol interference replicas, and outputs them to the intersymbol interference elimination section 1210.

The intersymbol interference elimination section 1210 receives as input the equalized signals from which the residual multipath interferences have been eliminated from the residual multipath interference elimination section 1208 and the intersymbol interference replicas from the intersymbol interference replica generation section 1209 and eliminates intersymbol interferences by reproducing, using the replicas, the respective spectra that the transmitting devices have not transmitted. The signals from which the intersymbol interferences have been thus eliminated are output to the time domain transform sections 1105-1 to 1105-M, respectively. A signal $\tilde{R}_m^{(i)}(k)$ after the intersymbol interference elimination for the transmitting antenna m, a subcarrier k, and iteration=i is expressed by the following equation (23):

$$\tilde{R}_m^{(i)}(k)=\hat{R}_m^{(i)}(k)+(1-G(k))A_m^{(i)}\hat{S}_m^{(i-1)}(k) \quad (23)$$

The detailed configuration of each of the symbol sequence estimation sections 1106-1 to 1106-M and that of each of the decoding/replica generation sections 1107-1 to 1107-M are basically the same as the block diagrams shown in FIGS. 7 and 9, respectively. In addition, the operations of these sections are also similar to those of the symbol sequence estimation section 206 and decoding/replica generation section 207 according to the first example, respectively.

3.3) Advantages

With the above-described configurations, according to the second example of the present invention, when a received SINR is good, a transmitting device transmits a portion of a spectrum generated in a wide band not by using high-order modulation, which produces a relatively small distance between signal points, but by using low-order modulation, which produces a relatively large distance between signal points, and a receiving device separates intersymbol interference due to a non-transmitted portion of the spectrum by interference elimination or sequence estimation. Thereby, it is possible to achieve high-speed radio MIMO transmission of a single-carrier signal tolerant of residual antenna interference and residual multipath interference, while maintaining frequency use efficiency.

Note that although the present example illustrates a configuration in which demodulation and decoding of transmitting-antenna signals and interference elimination are performed through parallel processing, another configuration is also conceivable in which the order of precedence is made based on the received powers or received qualities of the transmitting-antenna signals and the demodulation, decoding, and interference elimination are performed through serial processing. Such a configuration is also embraced in the present invention.

Moreover, in the present example, multi-user MIMO communication is taken as an example. However, the present invention also includes a case of performing single-user MIMO communication in which a single user has multiple transmitting devices (or transmitting antennas) and transmits different data signals from the individual transmitting antennas.

Furthermore, in the present example, each antenna signal is individually subjected to error correction coding and modulation. However, it is also conceivable to make a configuration such that all antenna signals are subjected together to error correction coding and modulation. Such a configuration is also incorporated in the present invention.

Additionally, according to the above-described first example, soft decision replica is generated by using the log likelihood ratio of each bit after decoding, and residual multipath interference and intersymbol interference are eliminated. According to the second example, in addition to them, antenna interference is also eliminated. However, it is also conceivable to make a configuration such that a hard decision replica is generated by using the hard decision value of each bit after decoding, and such a configuration is also included in the present invention. Moreover, it is also conceivable to make a configuration such that a replica is generated from a demodulated signal, not subjected to decoding, and such a configuration is also embraced in the present invention. Further, it is also conceivable to make a configuration such that a soft decision replica is generated by using extrinsic information, and such a configuration is also incorporated in the present invention.

The present invention is applicable to radio transmitting/receiving devices for single-carrier signals.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A radio communication device for receiving a single-carrier signal transmitted in a partial spectrum of Nyquist frequency band, comprising:
    an interference eliminator for eliminating interference from a received signal by spectrum reproduction of non-transmitted spectra using a symbol replica, to output an interference eliminated signal, wherein the interference includes intersymbol interference which is caused by symbols which are more than a predetermined distance away from a decision symbol point;
    a symbol sequence estimator for estimating a transmission symbol sequence by separating nearby intersymbol interference within the predetermined distance of the decision symbol point based on the interference eliminated signal, to output a decision signal; and
    a replica generator for generating the symbol replica from decoding result of the decision signal, wherein the symbol replica is fed back to the frequency-domain interference eliminator.

2. The radio communication device according to claim 1, wherein the partial spectrum is a central 1/B spectrum of the Nyquist frequency band, where B is a real number equal to or greater than 1, wherein B is a ratio of a bandwidth of the Nyquist frequency band to a bandwidth of the partial spectrum which is assumed to be 1.

3. The radio communication device according to claim 1, wherein the predetermined distance is determined depending on a degree of intersymbol interference to the decision point.

4. The radio communication device according to claim 3, wherein the predetermined distance is a predetermined number of symbols which indicates a number of symbols temporarily before and after the decision point.

5. The radio communication device according to claim 2, wherein the predetermined distance is a predetermined number of symbols which is determined depending on a degree of intersymbol interference to the decision point and indicates a number of symbols temporarily before and after the decision point.

6. The radio communication device according to claim 1, wherein the interference eliminator comprises:
an intersymbol interference eliminator for reproducing non-transmitted spectrum portions other than the partial spectrum by using the symbol replica to eliminate all intersymbol interference in frequency domain, to output the interference eliminated signal, and
wherein the symbol sequence estimator comprises:
a nearby intersymbol interference replica generator for generating a nearby intersymbol interference replica within the predetermined distance in time domain by using the symbol replica;
an adder for adding the nearby intersymbol interference replica to the interference eliminated signal to generate an interference added signal; and
a sequence selector for selecting the transmission symbol sequence with maximum likelihood by separating the nearby intersymbol interference from the interference added signal to output the decision signal.

7. The radio communication device according to claim 1, wherein the symbol sequence estimator performs sequence estimation only upon initial receipt of the received signal.

8. The radio communication device according to claim 1, wherein the interference eliminator comprises:
a frequency domain transformer for transforming the received signal to a frequency-domain received signal of a frequency spectrum;
a receiving filter for filtering a frequency domain signal including a received reference signal;
a channel estimator for estimating a channel based on the received reference signal to output a channel estimated value;
an iterative equalizer for equalizing the frequency domain signal using the channel estimated value and performing iterative elimination of residual multipath interference and intersymbol interference using a frequency-domain symbol replica to output an equalized signal; and
a time domain transformer for transforming the equalized signal to a time-domain equalized signal as the interference eliminated signal.

9. A method for receiving a single-carrier signal in a radio communication device, wherein the single-carrier signal is transmitted in a partial spectrum of Nyquist frequency band, comprising:
eliminating interference from a received signal by spectrum reproduction of non-transmitted spectra using a symbol replica, to output an interference eliminated signal, wherein the interference includes intersymbol interference which is caused by symbols which are more than a predetermined distance away from a decision symbol point;
estimating a transmission symbol sequence by separating nearby intersymbol interference within the predetermined distance of the decision symbol point based on the interference eliminated signal, to output a decision signal; and
generating the symbol replica from decoding result of the decision signal, wherein the symbol replica is fed back to the frequency-domain interference eliminator.

10. The method according to claim 9, wherein the partial spectrum is a central 1/B spectrum of the Nyquist frequency band, where B is a real number equal to or greater than 1, wherein B is a ratio of a bandwidth of the Nyquist frequency band to a bandwidth of the partial spectrum which is assumed to be 1.

11. The method according to claim 9, wherein the predetermined distance is determined depending on a degree of intersymbol interference to the decision point.

12. The method according to claim 11, wherein the predetermined distance is a predetermined number of symbols which indicates a number of symbols temporarily before and after the decision point.

13. The method according to claim 10, wherein the predetermined distance is a predetermined number of symbols which is determined depending on a degree of intersymbol interference to the decision point and indicates a number of symbols temporarily before and after the decision point.

14. The method according to claim 9, wherein the non-transmitted spectrum portions other than the partial spectrum are reproduced by using the symbol replica to eliminate all intersymbol interference in frequency domain, to output the interference eliminated signal,
wherein the decision signal is obtained by:
generating a nearby intersymbol interference replica within the predetermined distance in time domain by using the symbol replica;
adding the nearby intersymbol interference replica to the interference eliminated signal to generate an interference added signal; and
selecting the transmission symbol sequence with maximum likelihood by separating the nearby intersymbol interference from the interference added signal to output the decision signal.

15. The method according to claim 9, wherein the sequence estimation is performed only upon initial receipt of the received signal.

16. The method according to claim 9, wherein the interference eliminated signal is obtained by:
transforming the received signal to a frequency-domain received signal of a frequency spectrum;
filtering a frequency domain signal including a received reference signal;
estimating a channel based on the received reference signal to output a channel estimated value;
equalizing the frequency domain signal using the channel estimated value and performing iterative elimination of residual multipath interference and intersymbol interference using a frequency-domain symbol replica to output an equalized signal; and
transforming the equalized signal to a time-domain equalized signal as the interference eliminated signal.

17. A non-transitory computer-readable medium recording a program for receiving a single-carrier signal in a radio communication device, wherein the single-carrier signal is transmitted in a partial spectrum of Nyquist frequency band, comprising:
eliminating interference from a received signal by spectrum reproduction of non-transmitted spectra using a symbol replica, to output an interference eliminated signal, wherein the interference includes intersymbol interference which is caused by symbols which are more than a predetermined distance away from a decision symbol point;

estimating a transmission symbol sequence by separating nearby intersymbol interference within the predetermined distance of the decision symbol point based on the interference eliminated signal, to output a decision signal; and generating the symbol replica from decoding result of the decision signal, wherein the symbol replica is fed back to the frequency-domain interference eliminator.

18. A system comprising at least one radio transmitter and at least one radio receiver, wherein a radio transmitter transmits a single-carrier signal to a radio receiver in a partial spectrum of Nyquist frequency band, wherein the radio transmitter comprises:

an encoder for encoding a string of transmit information bits to output a string of encoded bits;

a modulator for modulating the string of encoded bits according to low-ordd modulation scheme to output a low-order modulated signal;

a frequency domain transformer for transforming the low-order modulated signal to a frequency-domain signal;

a partial-spectrum selector for selecting a central 1/B spectrum of the Nyquist frequency band of the frequency-domain signal, where B is a real number equal to or greater than 1, wherein B is a ratio of a bandwidth of the Nyquist frequency band to a bandwidth of the partial spectrum which is assumed to be 1; and a time domain transformer for transforming a frequency domain signal of the central 1/B spectrum to a time-domain signal, wherein the time-domain signal is transmitted as the single-carrier signal to the radio receiver, and wherein the radio receiver comprises:

an interference eliminator for eliminating interference from a received signal by spectrum reproduction of non-transmitted spectra using a symbol replica, to output an interference eliminated signal, wherein the interference includes intersymbol interference which is caused by symbols which are more than a predetermined distance away from a decision symbol point;

a symbol sequence estimator for estimating a transmission symbol sequence by separating nearby intersymbol interference within the predetermined distance of the decision symbol point based on the interference eliminated signal, to output a decision signal; and a replica generator for generating the symbol replica from decoding result of the decision signal, wherein the symbol replica is fed back to the frequency-domain interference eliminator.

19. The system according to claim 18, wherein the interference eliminator comprises:

a receiving-side first frequency domain transformer for transforming the received signal to a frequency-domain received signal of a frequency spectrum;

a receiving filter for filtering a frequency domain signal including a received reference signal;

a channel estimator for estimating a channel based on the received reference signal to output a channel estimated value;

an iterative equalizer for equalizing the frequency domain signal using the channel estimated value and performing iterative elimination of residual multipath interference and intersymbol interference using a frequency-domain symbol replica to output an equalized signal; and a receiving-side time domain transformer for transforming the equalized signal to a time-domain equalized signal as the interference eliminated signal, wherein the symbol sequence estimator separates the nearby symbol sequence by sequence estimation based on the time-domain equalized signal to output the decision signal, and wherein the replica generator comprises:

a decoding and replica generator for decoding the decision signal to generate the symbol replica from the decoding result; and a receiving-side second frequency domain transformer for transforming the symbol replica to the frequency-domain symbol replica which is output to the iterative equalizer.

20. The system according to claim 19, wherein iterative equalizer reproduces non-transmitted spectrum portions other than the partial spectrum by using the frequency-domain symbol replica to eliminate all intersymbol interference in frequency domain, to output the equalized signal, wherein the symbol sequence estimator comprises:

a nearby intersymbol interference replica generator for generating a nearby intersymbol interference replica within the predetermined distance in time domain by using the symbol replica;

an adder for adding the nearby intersymbol interference replica to the interference eliminated signal to generate an interference added signal;

a sequence selector for selecting the transmission symbol sequence with maximum likelihood by separating the nearby intersymbol interference from the interference added signal to output likelihood information; and a log likelihood ratio calculator for calculating a log likelihood ratio which is output as a soft decision signal.

21. The system according to claim 19, wherein the iterative equalizer comprises:

an equalization weight calculator for calculating equalization weight using the channel estimated value;

an equalization filter for filtering an equalized signal by equalizing the frequency domain signal input from the receiving filter based on the equalization weight;

a post-equalization channel gain generator for generating a post-equalization channel gain using the equalization weight;

an equalization desired component generator for generating an equalization desired component from the post-equalization channel gain;

a residual multipath interference replica generator for generating a residual multipath interference replica from the post-equalization channel gain, the equalization desired component, and the frequency-domain symbol replica input from the receiving-side second frequency domain transformer;

a residual multipath interference eliminator for eliminating residual multipath interference from the equalized signal using the residual multipath interference replica, to output a resultant signal as an equalized signal after residual multipath interference elimination;

an intersymbol interference replica generator for generating an intersymbol interference replica from the equalization desired component and the frequency-domain symbol replica input from the receiving-side second frequency domain transformer; and an intersymbol interference eliminator for eliminating intersymbol interference from the equalized signal after residual multipath interference elimination using the intersymbol interference replica to output the interference eliminated signal.

22. The system according to claim 18, wherein the symbol sequence estimator performs sequence estimation only upon initial receipt of the received signal.

23. The system according to claim 19, comprising a plurality of radio transmitters, each of which is the radio transmitter, wherein the iterative equalizer outputs the interference eliminated signal corresponding to each of the plurality of radio transmitters by iteratively eliminating antenna interference, residual multipath interference, and intersymbol interference caused by symbols which are more than the predetermined distance away from the decision symbol point.

* * * * *